US011955087B2

United States Patent
(12) United States Patent
In

(10) Patent No.: US 11,955,087 B2
(45) Date of Patent: Apr. 9, 2024

(54) DISPLAY DEVICE

(71) Applicant: Samsung Display Co., Ltd., Yongin-Si (KR)

(72) Inventor: Hai Jung In, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/081,687

(22) Filed: Dec. 15, 2022

(65) Prior Publication Data

US 2023/0298529 A1 Sep. 21, 2023

(30) Foreign Application Priority Data

Feb. 28, 2022 (KR) ........................ 10-2022-0026142

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0842* (2013.01); *G09G 2310/0286* (2013.01); *G09G 2310/08* (2013.01); *G09G 2330/021* (2013.01)

(58) Field of Classification Search
None
See application file for complete search history.

(56) References Cited

U.S. PATENT DOCUMENTS 9,355,741 B2 5/2016 Jeon et al.
10,152,910 B2 12/2018 Yoon et al.
10,381,426 B2 8/2019 Ka et al.
10,453,386 B2 10/2019 Jang
2011/0142191 A1* 6/2011 Tobita .................. G09G 3/3677 377/64
2015/0029082 A1* 1/2015 Jeon ..................... G09G 3/3677 377/64
2016/0225307 A1* 8/2016 Yoon .................... G09G 3/2092
2017/0061861 A1* 3/2017 Dun ........................ G11C 19/28
2021/0035480 A1* 2/2021 Zou ......................... G11C 19/28
2021/0407429 A1* 12/2021 Seo ...................... G09G 3/3233

FOREIGN PATENT DOCUMENTS

KR 10-2018-0004369 A 1/2018
KR 10-2004912 B1 10/2019
KR 10-2085152 B1 3/2020
KR 10-2244015 B1 4/2021

* cited by examiner

*Primary Examiner* — Dorothy Harris
(74) *Attorney, Agent, or Firm* — Innovation Counsel LLP

(57) ABSTRACT

A display device includes scan lines, pixels electrically connected to the scan lines, and a scan driver including stages for supplying scan signals through the scan lines to the pixels. The stages include a stage that includes the following elements: a first node setting unit for setting a voltage of a first node; a second node setting unit for setting a voltage of a second node based on the voltage of the first node; a third node setting unit for setting a voltage of a third node based on the voltage of the second node; and an output unit for outputting a scan signal based on the voltage of the third node. Each of the first and third node setting units includes an N-type transistor. The scan driver further includes a first charge pump for supplying a first bias voltage to a back-gate electrode of the N-type transistor.

20 Claims, 18 Drawing Sheets

DISPLAY DEVICE

CROSS-REFERENCE TO RELATED APPLICATION

The present application claims priority under 35 U.S.C. § 119(a) to Korean patent application No. 10-2022-0026142 filed on Feb. 28, 2022 in the Korean Intellectual Property Office; the Korean patent application is incorporated by reference.

BACKGROUND

1. Technical Field

The technical field relates to a display device.

2. Related Art

A display device may display images in response to input signals. Modern display devices include liquid crystal display devices and organic light emitting display devices.

Each pixel of a display device may emit light with a luminance corresponding to a data voltage supplied through a data line. The display device may display an image with an emission combination of the pixels of the display device.

In the display device, a plurality of pixels may be connected to each data line. A scan driver may provide a scan signal for selecting a pixel to which a data voltage is to be supplied among the pixels. An emission driver may provide an emission signal for controlling an emission period of the pixel. The scan driver or the emission driver may include shift registers to sequentially provide a scan signal having a turn-on level or an emission signal having a turn-off level.

All the transistors of each of the scan driver and the emission driver may be PMOS transistors, such that an output waveform of a pulse of the scan signal or the emission signal has a middle step shape. A voltage having the middle step shape may have different magnitudes for different positions according to a process deviation. Therefore, a horizontal defect may occur in an image displayed by the display device.

SUMMARY

Embodiments may be related to a display device. In the display device, a pulse of a scan signal or an emission signal has no middle step shape. Advantageously, the display device may display images with minimum horizontal defects, and the power consumption of the display device can be minimized.

The display device may include scan lines, pixels connected to the scan lines, and a scan driver including stages for supplying scan signals through the scan lines to the pixels. The stages may include a stage that includes the following elements: a first node setting unit configured to discharge a voltage of a first node at a logic low level when a scan start signal or a carry signal has a logic high level and a first clock signal or a second clock signal has the logic high level; a second node setting unit configured to charge a voltage of a second node at the logic high level when the voltage of the first node has the logic low level, and configured to discharge the voltage of the second node at the logic low level when the voltage of the first node has the logic high level; a third node setting unit configured to charge a voltage of a third node at the logic high level when the voltage of the second node has the logic low level, and configured to discharge the voltage of the third node at the logic low level when the voltage of the second node has the logic high level; and an output unit configured to output a scan signal having the logic high level when the voltage of the third node has the logic low level, and configured to output a scan signal having the logic low level when the voltage of the third node has the logic high level. Each of the first node setting unit and the third node setting unit includes at least one N-type transistor. The scan driver further includes a first charge pump for supplying a first bias voltage to a back-gate electrode of the at least one N-type transistor included in each of the first node setting unit and the third node setting unit. The term “connected” may mean “electrically connected” or “electrically connected through no intervening transistor.”

The first node setting unit may include the following elements: a first transistor including a first electrode receiving a voltage having the logic high level, a second electrode, and a gate electrode receiving the scan start signal or the carry signal, the first transistor being a P-type transistor; a second transistor including a first electrode connected to the second electrode of the first transistor, a second electrode connected to the first node, and a gate electrode receiving the first clock signal, the second transistor being a P-type transistor; a third transistor including a first electrode connected to the first node, a second electrode, and a gate electrode receiving the second clock signal, the third transistor being an N-type transistor; and a fourth transistor including a first electrode connected to the second electrode of the third transistor, a second electrode receiving a voltage having the logic low level, and a gate electrode receiving the scan start signal or the carry signal, the fourth transistor being an N-type transistor.

The first node setting unit may further include the following elements: a fifth transistor including a first electrode receiving the voltage of the logic high level, a second electrode, and a gate electrode connected to the second node, the fifth transistor being a P-type transistor; a sixth transistor including a first electrode connected to the second electrode of the fifth transistor, a second electrode connected to the first node, and a gate electrode receiving the second clock signal, the sixth transistor being a P-type transistor; a seventh transistor including a first electrode connected to the first node, a second electrode, and a gate electrode receiving the first clock signal, the seventh transistor being an N-type transistor; and an eighth transistor including a first electrode connected to the second electrode of the seventh transistor, a second electrode receiving the voltage having the logic low level, and a gate electrode connected to the second node, the eighth transistor being an N-type transistor.

The initialization unit may include a ninth transistor including a first electrode receiving the voltage having the logic high level, a second electrode connected to the first node, and a gate electrode receiving the initialization signal, the ninth transistor being a P-type transistor.

The second node setting unit may include the following elements: a tenth transistor including a first electrode receiving the voltage having the logic high level, a second electrode connected to the second node, and a gate electrode connected to the first node, the tenth transistor being a P-type transistor; and an eleventh transistor including a first electrode connected to the second node, a second electrode receiving the voltage having the logic low level, and a gate electrode connected to the first node, the eleventh transistor being an N-type transistor.

The third node setting unit may include the following elements: a twelfth transistor including a first electrode receiving the voltage having the logic high level, a second electrode connected to the third node, and a gate electrode connected to the second node, the twelfth transistor being a P-type transistor; and a thirteenth transistor including a first electrode connected to the third node, a second electrode receiving the voltage having the logic low level, and a gate electrode connected to the second node, the thirteenth transistor being an N-type transistor.

The output unit may include the following elements: a fourteenth transistor including a first electrode receiving the voltage having the logic high level, a second electrode connected to an output terminal, and a gate electrode connected to the third node, the fourteenth transistor being a P-type transistor; and a fifteenth transistor including a first electrode connected to the output terminal, a second electrode receiving the voltage having the logic low level, and a gate electrode connected to the third node, the fifteenth transistor being an N-type transistor.

Each of the stages may further include a first capacitor including a first electrode receiving the voltage having the logic high level and a second electrode connected to the second node.

The first charge pump may include the following elements: a sixteenth transistor including a gate electrode receiving a first reference voltage, a first electrode receiving the first reference voltage, and a second electrode connected to a fourth node; a second capacitor including a first electrode connected to the fourth node and a second electrode; a seventeenth transistor including a first electrode connected to the second electrode of the second capacitor, a second electrode receiving the first clock signal or the second clock signal, and a gate electrode connected to the fourth node; and an eighteenth transistor including a first electrode connected to the fourth node, a gate electrode connected to the fourth node, and a second electrode supplying the first bias voltage.

The first charge pump may further include a third capacitor including a first electrode receiving the first reference voltage and a second electrode connected to the second electrode of the eighteenth transistor.

Each of the second node setting unit and the output unit may include at least one N-type transistor. The first charge pump may supply the first bias voltage to a back-gate electrode of the at least one N-type transistor included in each of the second node setting unit and the output unit.

The first bias voltage may be supplied to back-gate electrodes of the third transistor, the fourth transistor, the seventh transistor, the eighth transistor, the eleventh transistor, the thirteenth transistor, and the fifteenth transistor.

Each of the second node setting unit and the output unit may include at least one N-type transistor. Each of the stages may further include a second charge pump configured to supply a second bias voltage to a back-gate electrode of the at least one N-type transistor included in each of the second node setting unit and the output unit.

The first bias voltage may be supplied to back-gate electrodes of the third transistor, the fourth transistor, the seventh transistor, the eighth transistor, and the thirteenth transistor, and the second bias voltage may be supplied to back-gate electrodes of the eleventh transistor and the fifteenth transistor.

The second charge pump may include the following elements: a nineteenth transistor including a gate electrode receive a second reference voltage, a first electrode receiving the second reference voltage, and a second electrode connected to a fifth node; a fourth capacitor including a first electrode and including a second electrode connected to the fifth node; a twentieth transistor including a first electrode receiving the first clock signal or the second clock signal, a second electrode connected to the first electrode of the fourth capacitor, and a gate electrode connected to the fifth node; and a twenty-first transistor including a first electrode connected to the fifth node, a gate electrode connected to the fifth node, and a second electrode supplying the second bias voltage.

The first reference voltage and the second reference voltage may be set to have the same initial value. The second reference voltage may be set higher than the first reference voltage afterward (as time elapses).

The scan driver may further include a second charge pump configured to supply the first bias voltage. The first charge pump may operate based on the second clock signal. The second charge pump may operate based on the first clock signal. A phrase difference between the first clock signal and the second clock signal may be 180 degrees.

The first node setting unit may include the following elements: a first transistor including a first electrode receiving a voltage having the logic high level, a second electrode, and a gate electrode receiving the first clock signal, the first transistor being a P-type transistor; a second transistor including a first electrode connected to the second electrode of the first transistor, a second electrode connected to the first node, and a gate electrode receiving the scan start signal or the carry signal, the second transistor being a P-type transistor; a third transistor including a first electrode connected to the first node, a second electrode, and a gate electrode receiving the scan start signal or the carry signal, the third transistor being an N-type transistor; and a fourth transistor including a first electrode connected to the second electrode of the third transistor, a second electrode receiving a voltage having the logic low level, and a gate electrode receiving the second clock signal, the fourth transistor being an N-type transistor.

The first node setting unit may further include the following elements: a fifth transistor including a first electrode receiving the voltage having the logic high level, a second electrode, and a gate electrode receiving the second clock signal, the fifth transistor being a P-type transistor; a sixth transistor including a first electrode connected to the second electrode of the fifth transistor, a second electrode connected to the first node, and a gate electrode connected to the second node, the sixth transistor being a P-type transistor; a seventh transistor including a first electrode connected to the first node, a second electrode, and a gate electrode connected to the second node, the seventh transistor being an N-type transistor; and an eighth transistor including a first electrode connected to the second electrode of the seventh transistor, a second electrode receiving the voltage having the logic low level, and a gate electrode receiving the first clock signal, the eighth transistor being an N-type transistor.

BRIEF DESCRIPTION OF THE DRAWINGS

Each of FIG. 12, FIG. 13, FIG. 14, FIG. 15, FIG. 16.

Each of FIG. 18

DETAILED DESCRIPTION

Figure 1:
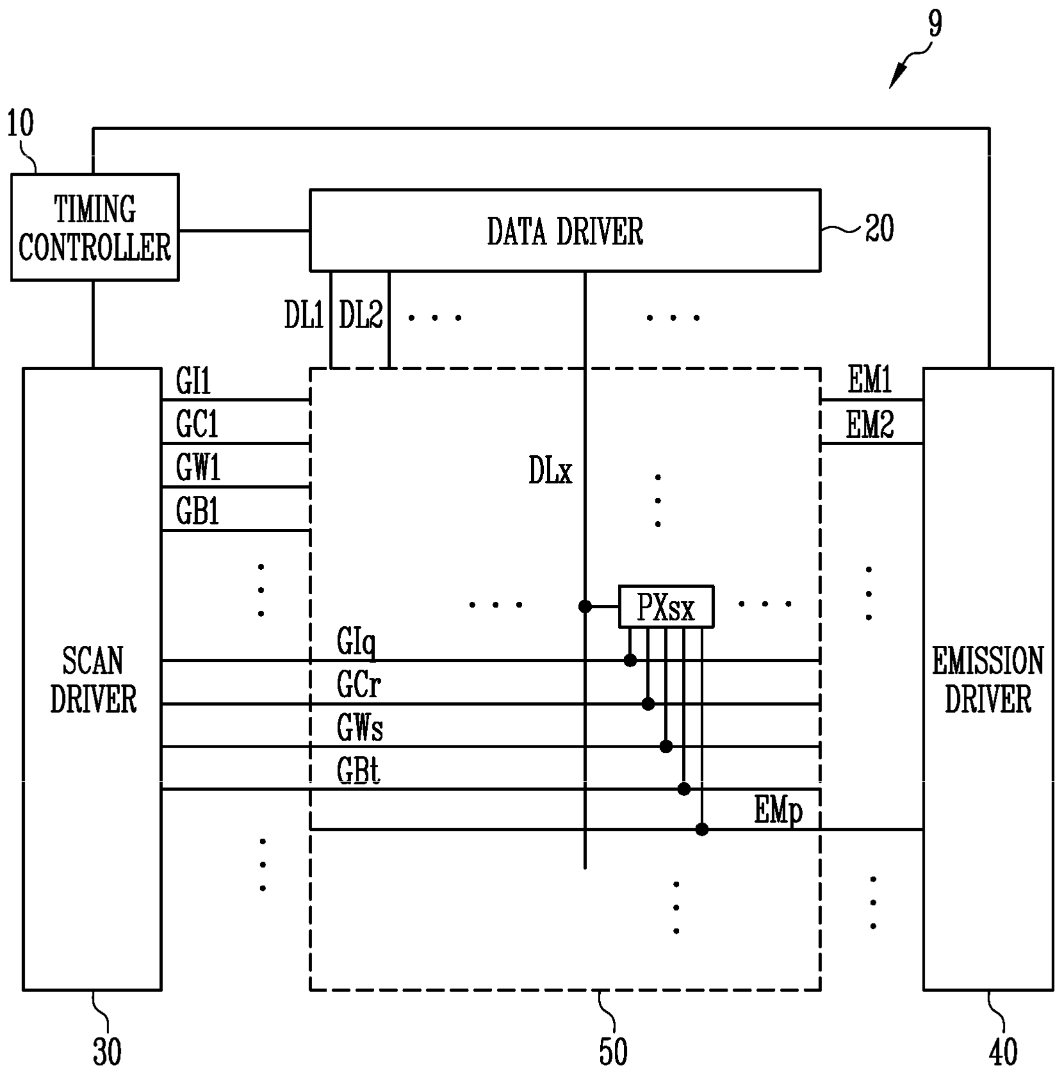
FIG. 1 illustrates a display device in accordance with an embodiment.

Examples of embodiments are described with reference to the accompanying drawings. Practical embodiments may be implemented in various different forms and are not limited to the described embodiments.

In the present disclosure, the same or similar elements may be designated by the same reference numerals/characters.

Dimensions of elements illustrated in the drawings may be exaggerated for clarity.

Although the terms "first," "second," etc. may be used to describe various elements, these elements should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-category (or first-set)," "second-category (or second-set)," etc., respectively.

The term "connect" may mean "directly connect" or "indirectly connect." The term "connect" may mean "mechanically connect" and/or "electrically connect." The term "connected" may mean "electrically connected" or "electrically connected through no intervening transistor." The term "insulate" may mean "electrically insulate" or "electrically isolate." The term "conductive" may mean "electrically conductive." The term "drive" may mean "operate" or "control." The term "adjacent" may mean "immediately adjacent." The term "include" may mean "be formed of." The term "identical" may mean "substantially identical"

FIG. 1 illustrates a display device 9 in accordance with an embodiment.

Referring to FIG. 1, the display device 9 may include a timing controller 10, a data driver 20, a scan driver 30, an emission driver and a pixel unit 50.

The timing controller 10 may receive an external input signal from an external device. The external input signal may include a vertical synchronization signal, a horizontal synchronization signal, a data enable signal, a RGB data signal, and the like.

The vertical synchronization signal may include a plurality of pulses, and may indicate that a previous frame period is ended and a current frame period is started with respect to a time at which each of the pulses is generated. An interval between the starts of adjacent pulses of the vertical synchronization signal may correspond to one frame period. The horizontal synchronization signal may include a plurality of pulses, and may indicate that a previous horizontal period is ended and a new horizontal period is started with respect to a time at which each of the pulses is generated. An interval between the starts of adjacent pulses of the horizontal synchronization signal may correspond to one horizontal period. The data enable signal may have an enable level with respect to specific horizontal periods, and may have a disable level in the other periods. When the data enable signal has the enable level, an RGB data signal may be supplied in the corresponding horizontal periods. The RGB data signal may be supplied in units of pixel rows in each of the corresponding horizontal periods. The timing controller 10 may generate grayscale values, based on the RGB data signal, corresponding to specifications of the display device 9. The timing controller 10 may generate control signals to be supplied to the data driver 20, the scan driver 30, the emission driver 40, and the like, based on the external input signal, corresponding to the specifications of the display device 9.

The data driver 20 may generate data voltages to be provided to data lines DL1, DL2, . . . , DLx, . . . using the grayscale values and the control signals, which are received from the timing controller 10.

The data driver 20 may sample the grayscale values using a clock signal, and supply data voltages corresponding to grayscale values to the data lines DL1, DL2, . . . , DLx, . . . in units of pixel rows (e.g., pixels connected to the same scan lines and the same emission lines). Here, x may be an integer greater than 0.

The scan driver 30 may generate scan signals to be provided to scan lines GI1, GC1, GW1, GB1, . . . , GIq, GCr, GWs, GBt, . . . using a clock signal, a scan start signal, and the like received from the timing controller 10. Here, q, r, s, and t are integers greater than 0.

The scan driver 30 may include a plurality of sub-scan drivers. A first sub-scan driver may generate scan signals provided to first scan lines GI1, . . . , GIq, . . . . A second sub-scan driver may generate scan signals provided to second scan lines GC1, . . . , GCr, . . . . A third sub-scan driver may generate scan signals provided to third scan lines GW1, . . . , GWs, . . . . A fourth sub-scan driver may generate scan signals provided to fourth scan lines GB1, . . . , GBt, . . . . Each of the sub-scan drivers may include a plurality of stages connected to each other in the form of shift registers. The scan driver 30 may generate scan signals in a manner that a turn-on level pulse of the scan start signal supplied to a scan start line to a next scan stage may be sequentially transferred under the control of the clock signal. Some sub-scan drivers may be integrated.

The emission driver 40 may generate emission signals to be provided to emission lines EM1, EM2, . . . , EMp, . . . using a clock signal, an emission stop signal, and the like received from the timing controller 10. Here, p may be an integer greater than 0. The emission driver 40 may sequentially provide emission signals having a pulse of a turn-off level to the emission lines EM1, EM2, . . . , EMp, . . . . The emission driver 40 may include shift registers, and may generate emission signals in a manner that a turn-off level pulse of the emission stop signal to a next emission stage may be sequentially transferred under the control of the clock signal.

The pixel unit 50 includes pixels. For example, a pixel PXsx may be connected to a corresponding data line DLx, corresponding scan lines GIq, GCr, GWs, and GBt, and a corresponding emission line EMp.

Figure 2:
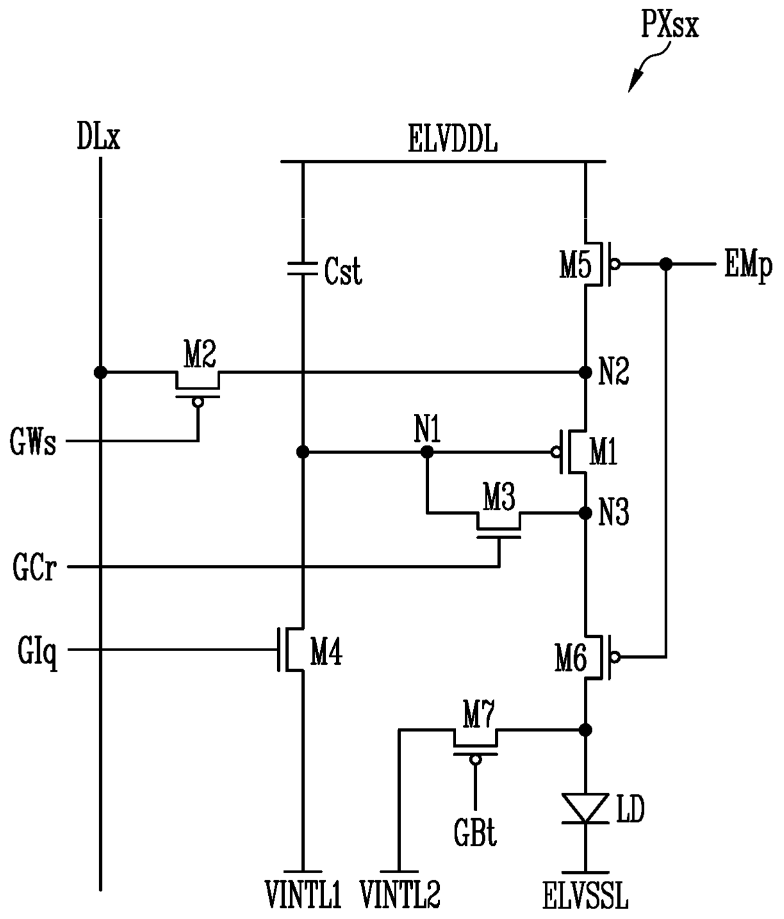
FIG. 2 illustrates a pixel in accordance with an embodiment.

FIG. 2 illustrates a pixel PXsx in accordance with an embodiment.

Referring to FIG. 2, the pixel PXsx may include transistors M1, M2, M3, M4, M5, M6, and M7, a capacitor Cst, and a light emitting element LD.

The transistor M1 may include a gate electrode connected to a node N1, a first electrode connected to a node N2, and a second electrode connected to a node N3. The transistor M1 may be referred to as a driving transistor.

The transistor M2 may include a gate electrode receiving one of third scan signals, a first electrode connected to a data line DLx, and a second electrode connected to the node N2. The gate electrode of the transistor M2 may be connected to a third scan line GWs. The transistor M2 may be referred to as a scan transistor.

The transistor M3 may include a gate electrode receiving one of second scan signals, a first electrode connected to the node N1, and a second electrode connected to the node N3. The gate electrode of the transistor M3 may be connected to a second scan line GCr. The transistor M3 may be referred to as a diode connection transistor.

The transistor M4 may include a gate electrode receiving one of first scan signals, a first electrode connected to the node N1, and a second electrode connected to a first initialization line VINTL1. The gate electrode of the transistor M4 may be connected to a first scan line GIq. The transistor M4 may be referred to as a gate initialization transistor.

The transistor M5 may include a gate electrode receiving one of emission signals, a first electrode connected to a first power line ELVDDL, and a second electrode connected to the node N2. The gate electrode of the transistor M5 may be connected to an emission line EMp. The transistor M5 may be referred to as a first emission transistor.

The transistor M6 may include a gate electrode receiving one of the emission signals, a first electrode connected to the node N3, and a second electrode. The gate electrode of the transistor M6 may be connected to the emission line EMp. The transistor M6 may be referred to as a second emission transistor.

The transistor M7 may include a gate electrode receiving one of fourth scan signals, a first electrode connected to a second initialization line VINTL2, and a second electrode. The gate electrode of the transistor M7 may be connected to a fourth scan line GBt. The transistor M7 may be referred to as an anode initialization transistor. The gate electrode of the transistor M7 may be connected to the third scan line GWs.

The capacitor Cst may include a first electrode connected to the first power line ELVDDL and may include a second electrode connected to the node N1.

The light emitting element LD may include a first electrode (e.g., an anode) connected to the second electrode of the transistor M6 and the second electrode of the transistor M7 and may include a second electrode (e.g., a cathode) connected to a second power line ELVSSL. During an emission period of the light emitting element LD, a voltage applied to the second power line ELVSSL may be set lower than a voltage applied to the first power line ELVDDL. The light emitting element LD may be an organic light emitting diode, an inorganic light emitting diode, a quantum dot/well light emitting diode, or the like. The pixel PXsx may include only one light emitting element LD, as illustrated in FIG. 2. The pixel PXsx may include light emitting elements connected in series, parallel, or series/parallel.

The transistors M1, M2, M5, M6, and M7 may be P-type transistors. Channels of the transistors M1, M2, M5, M6, and M7 may include poly-silicon. A poly-silicon transistor may be a low temperature poly-silicon (LTPS) transistor. The poly-silicon transistor has high electron mobility, and has a fast driving characteristic according to the high electron mobility.

The transistors M3 and M4 may be N-type transistors. Channels of the transistors M3 and M4 may include an oxide semiconductor. An oxide semiconductor transistor can be formed through a low temperature process, and have charge mobility lower than the charge mobility of the poly-silicon semiconductor transistor. Thus, a leakage current amount of oxide semiconductor transistors, which occurs in a turn-off state, is small as compared with poly-silicon transistors.

Figure 3:
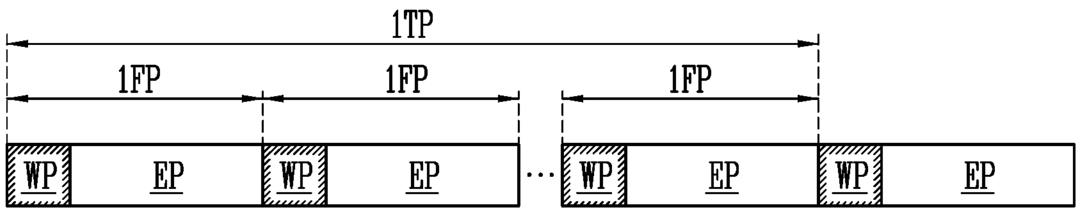
FIG. 3 illustrates a high frequency driving method in accordance with an embodiment.

FIG. 3 illustrates a high frequency driving method in accordance with an embodiment.

When the pixel unit 50 displays frames at a first driving frequency, the display device 9 may be driven in a first display mode. When the pixel unit 50 displays frames at a second driving frequency, the display device 9 may be driven in a second display mode.

In the first display mode, the pixel unit 50 may display frames at 20 Hz or higher, e.g., 60 Hz. In the second display mode, the pixel unit 50 may display frames at less than 20 Hz, e.g., 1 Hz. The second display mode may be a low power display mode. A period 1TP is defined to compare the first display mode and the second display mode with each other. The period 1TP may mean the same time interval in the first display mode and the second display mode.

In the first display mode, the period 1TP may include a plurality of frame periods 1FP. In the first display mode, each of the frame periods 1FP may sequentially include a data write period WP and an emission period EP. Each of the periods 1TP, 1FP, WP, and EP may be defined with respect to each pixel row.

During the period 1TP, a pixel may display a plurality of image frames corresponding to a number of frame periods 1FP, based on data voltages received in data write periods WP.

Figure 4:
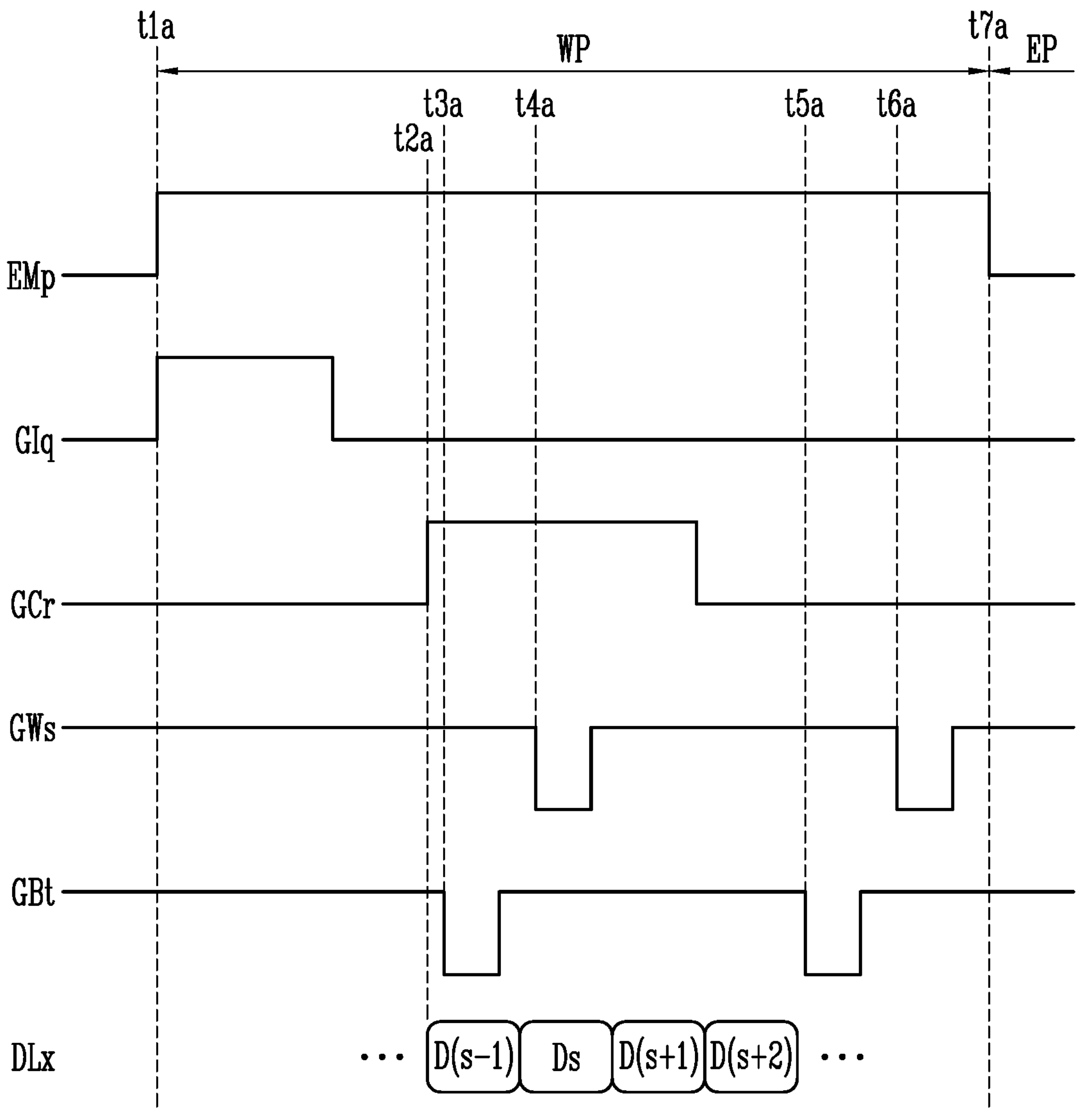
FIG. 4 illustrates a data write period in accordance with an embodiment.

FIG. 4 illustrates a data write period in accordance with an embodiment.

Referring to FIG. 4, a driving method of a data write period WP and an emission period EP associated with the pixel PXsx is illustrated.

At a time t1*a*, an emission signal having a turn-off level (e.g., a logic high level) may be applied to the emission line EMp. Accordingly, the transistor M5 and the transistor M6 may be turned off, and the light emitting element LD may be in a non-emission state.

At the time t1*a*, a first scan signal having a turn-on level (e.g., a logic high level) may be applied to the first scan line GIq. Accordingly, the transistor M4 may be turned on, and the node N1 and the first initialization line VINTL1 may be electrically connected to each other. Therefore, the node N1 may be initialized to a first initialization voltage of the first initialization line VINTL1. The first initialization voltage may be sufficiently lower than a voltage of the node N2. Thus, the transistor M1 can be on-biased, and a hysteresis phenomenon depending on a grayscale of a previous frame period can be prevented.

At a time t2*a*, a second scan signal having the turn-on level (e.g., the logic high level) may be applied to the second scan line GCr. Accordingly, the transistor M3 may be turned on, and the transistor M1 may be connected in a diode form.

At a time t3*a*, a fourth scan signal having the turn-on level (e.g., a logic low level) may be applied to the fourth scan line GBt. Accordingly, the transistor M7 may be turned on, the second initialization line VINTL2 and the first electrode of the light emitting element LD may be connected to each other. Therefore, the first electrode of the light emitting element LD may be initialized to a second initialization voltage of the second initialization line VINTL2. The second initialization voltage may be a sufficiently low voltage, and accordingly, black grayscale or low grayscale expression of the light emitting element LD can be facilitated. The second initialization voltage may be equal to or smaller than a voltage of the second power line ELVSSL.

At a time t4*a*, a third scan signal having the turn-on level (e.g., the logic low level) may be applied to the third scan line GWs. Accordingly, the transistor M2 may be turned on, and the data line DLx and the node N2 may be electrically connected to each other. Data voltages D(s−1), Ds, D(s+1), and D(s+2) corresponding to each pixel row are sequentially applied to the data line DLx. At the time t4*a*, a data voltage Ds corresponding to the pixel PXsx may be applied to the data line DLx. A magnitude of the data voltage Ds may correspond to a grayscale of the pixel PXsx. The data voltage Ds may be applied to the gate electrode of the transistor M1 sequentially via the transistor M2, the transistor M1, and the transistor M3. The voltage applied to the gate electrode of the transistor M1 is a compensated data voltage Ds including a decrement corresponding to a threshold voltage of the transistor M1. The compensated data voltage Ds is maintained by the capacitor Cst.

Figure 6:
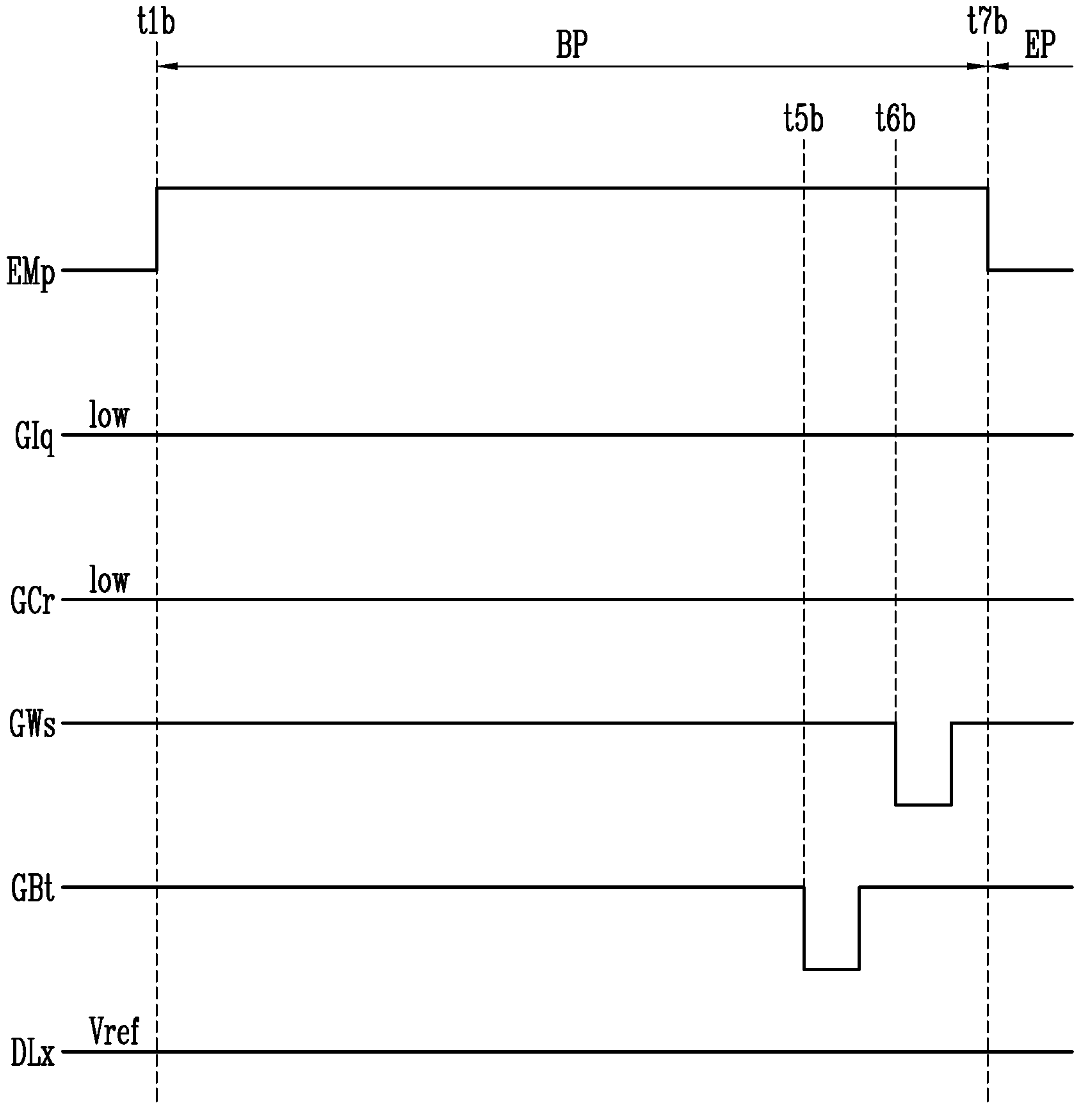
FIG. 6 illustrates a bias refresh period in accordance with an embodiment.

At a time t5*a*, the fourth scan signal having the turn-on level (e.g., the logic low level) may be applied to the GBt. In addition, at a time t6*a*, the third scan signal having the turn-on level (e.g., the logic low level) may be applied to the third scan line GWs. A timing in signal application at the time t5*a* and the time t6*a* is adjusted to a timing in signal application at a time t5*b* and a time t6*b*, which are shown in FIG. 6 such that light emission waveforms of the light emitting element LD in high frequency driving and low frequency driving become similar to each other.

At a time t7*a*, the emission signal having the turn-on level (e.g., the logic low level) may be applied to the emission line EMp. Accordingly, the transistor M5 and the transistor M6 may be turned on, and the light emitting element LD may be in an emission state.

Figure 5:
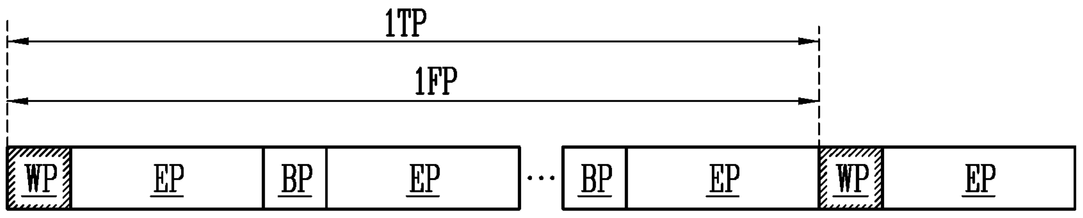
FIG. 5 illustrates a low frequency driving method in accordance with an embodiment.

FIG. 5 illustrates a low frequency driving method in accordance with an embodiment.

In the second display mode, a period 1TP and one frame period 1FP may have the same length. In the second display mode, each frame period 1FP may sequentially include a data write period WP, an emission period EP, a bias refresh period BP, and an emission period EP.

The transistors M3 and M4 of the pixel PXsx maintain the turn-off state in bias refresh periods BP, and hence the capacitor Cst maintains the same data voltage during one frame period 1FP. The transistors M3 and M4 may be oxide semiconductor transistors, and thus a leakage current can be minimized.

Therefore, the pixel PXsx may display the same single image frame during the period 1TP, based on a data voltage Ds supplied in the data write period WP.

FIG. 6 illustrates a bias refresh period in accordance with an embodiment.

Signal application methods of the signal lines EMp, GWs, and GBt at times t1*b*, *t*5*b*, *t*6*b*, and t7*b* shown in FIG. 6 may respectively correspond to the signal application methods of the signal lines EMp, GWs, and GBt at the times t1*a*, *t*5*a*, *t*6*a*, and t7*a* shown in FIG. 4. Thus, a light emission waveform of the light emitting element LD in low frequency driving becomes similar to a light emission waveform of the light emitting element LD in high frequency driving, so that no conspicuous flicker is viewed by a user.

During a bias refresh period BP, scan signals having the turn-off level (e.g., the logic low level) supplied to the first scan line GIq and the second scan line GCr may be maintained. Accordingly, a voltage of the node N1 may be maintained during one frame period 1FP.

During the bias refresh period BP, the data line DLx may be maintained with a reference voltage Vref. In another example, no data voltage may be supplied, or a data voltage having another voltage level may be supplied regardless of the grayscale of the pixel PXsx.

Figure 7:
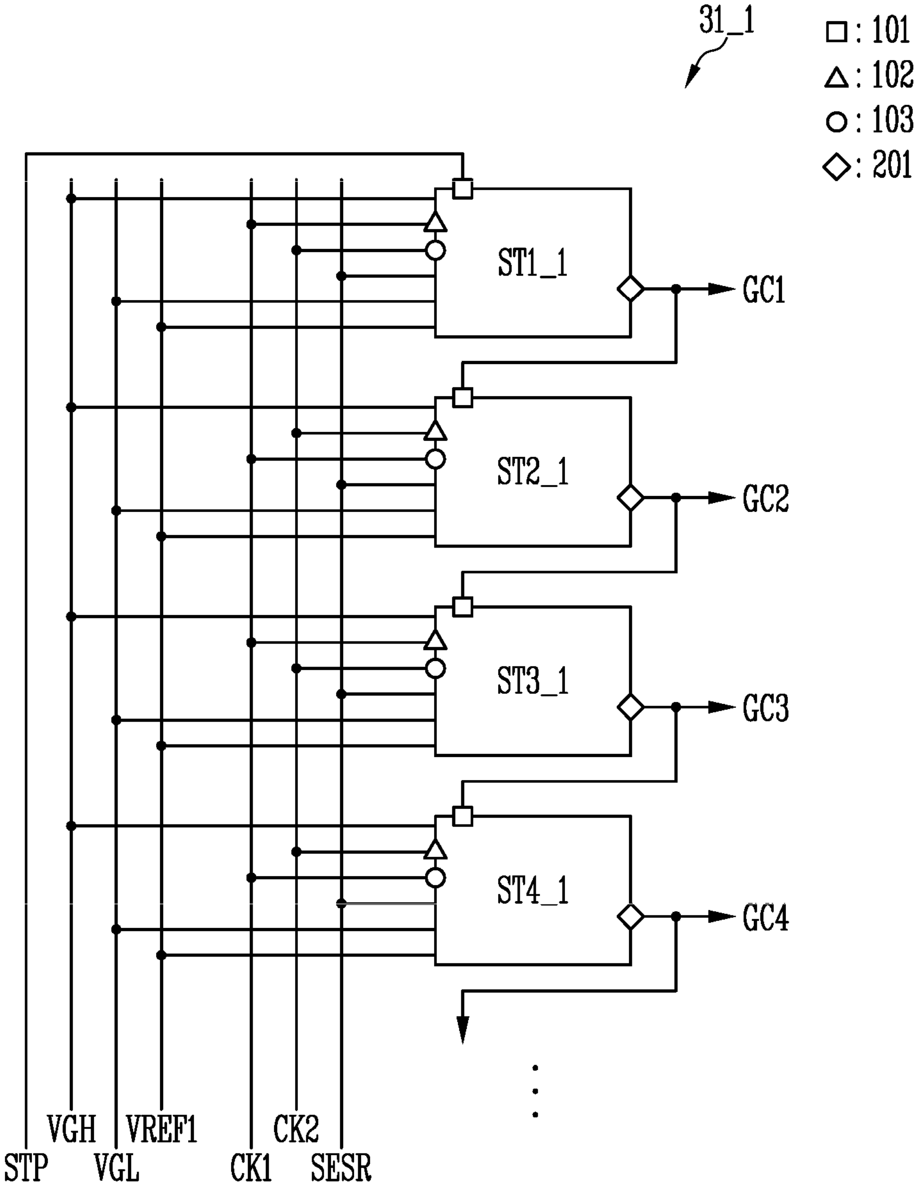
FIG. 7 illustrates a scan driver in accordance with an embodiment.

FIG. 7 illustrates a scan driver 31_1 in accordance with an embodiment.

The scan driver 31_1 may be the second sub-scan driver supplying second scan signals to second scan lines GC1, GC2, GC3, GC4, . . . . Referring to the signals shown in FIG. 4, a positive pulse is applied even to the first scan line GIq and the emission line EMp; therefore, the first sub-scan driver connected to the first scan line GIq and the emission driver 40 connected to the emission line EMp also have the same configuration as the scan driver 31_1 (only cycles and timings of clock signals are set differently).

Referring to FIG. 7, the scan driver 31_1 may include a plurality of stages ST1_1, ST2_1, ST3_1, ST4_1, . . . .

Each of the stages ST1_1 to ST4_1 may include a first input terminal 101, a second input terminal 102, a third input terminal 103, common input terminals, and an output terminal 201. Each of the stages ST1_1 to ST4_1 may receive a high voltage VGH, a low voltage VGL, a first reference voltage VREF1, and an initialization signal SESR through the common input terminals.

A first input terminal 101 of a first stage ST1_1 may receive a scan start signal STP. Each of first input terminals 101 of stages ST2_1, ST3_1, ST4_1, . . . after the first stage ST1_1 may be connected to an output terminal 201 of a previous stage. Each of first input terminals 101 of the stages ST2_1, ST3_1, ST4_1, . . . after the first stage ST1_1 may receive, as a carry signal, a second scan signal output from the previous stage.

A second input terminal 102 and a third input terminal 103 of each of the stages ST1_1 to ST4_1 may receive different clock signals CK1 and CK2. For example, second input terminals 102 of the stages ST1_1 to ST4_1 may alternately receive a first clock signal CK1 and a second clock signal CK2. For example, second input terminals 102 of odd-numbered stages ST1_1 and ST3_1 may receive the first clock signal CK1. Second input terminals 102 of even-numbered stages ST2_1 and ST4_1 may receive the second clock signal CK2.

Third input terminals 103 of the stages ST1_1 to ST4_1 may alternately receive the second clock signal CK2 and the first clock signal CK1. For example, third input terminals 103 of the odd-numbered stages ST1_1 and ST3_1 may receive the second clock signal CK2. Third input terminals 103 of the even-numbered stages ST2_1 and ST4_1 may receive the first clock signal CK1.

Figure 8:
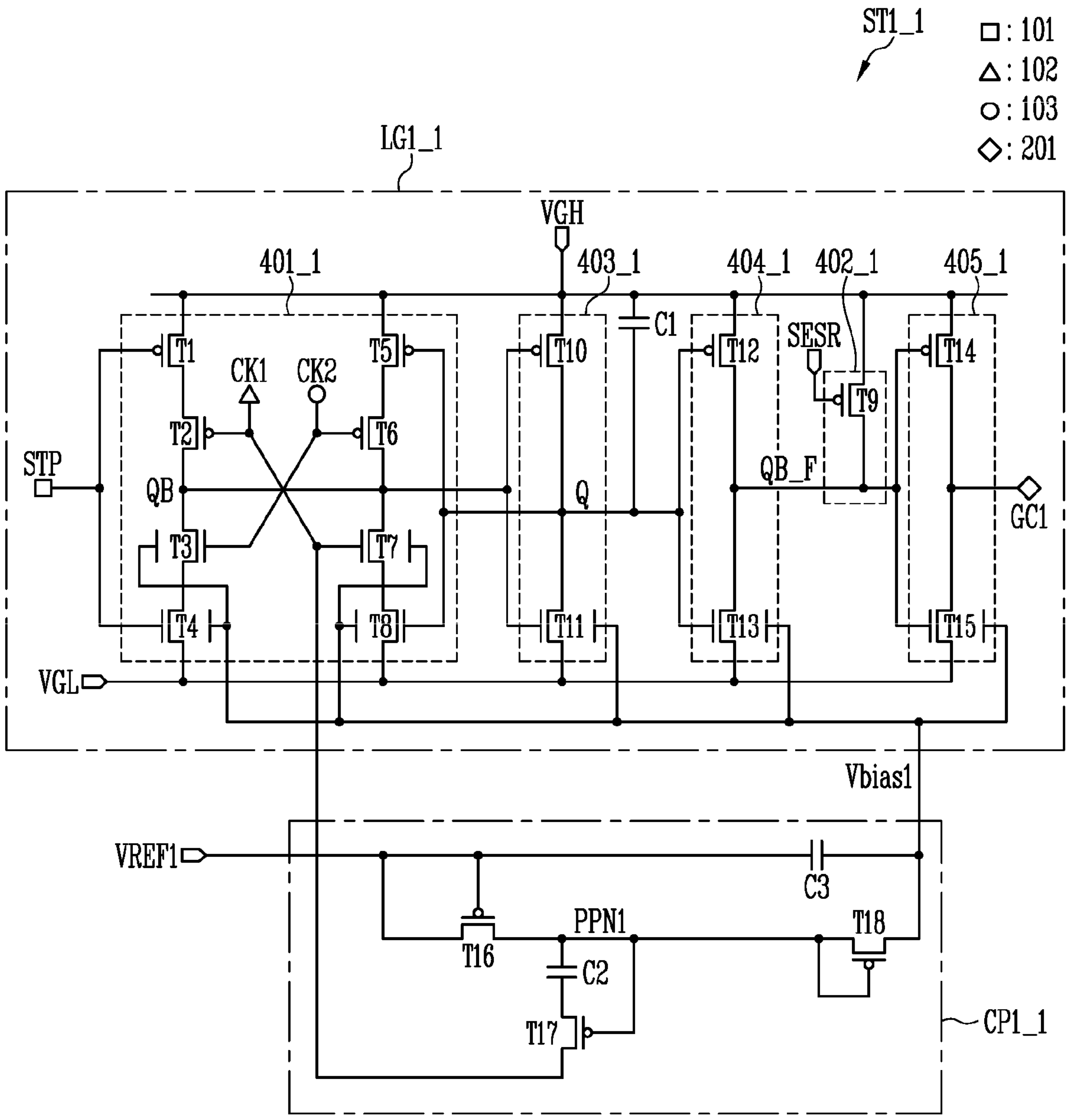
FIG. 8 illustrates a stage in accordance with an embodiment.

FIG. 8 illustrates a stage ST1_1 in accordance with an embodiment.

Referring to FIG. 8, the first stage ST1_1 may include a first node setting unit 401_1, an initialization unit 402_1, a second node setting unit 403_1, a third node setting unit 404_1, an output unit 405_1, and a first charge pump CP1_1. The other stages ST2_1, ST3_1, ST4_1, . . . may have the same configuration as the first stage ST1_1, except that the input terminal 101 of each of the other stages ST2_1, ST3_1, ST4_1, . . . receives a carry signal.

The first node setting unit 401_1 may discharge a voltage of a first node QB at the logic low level, when the scan start signal STP has the logic high level and the second clock signal CK2 has the logic high level. The first node setting unit 401_1 may include first to eighth transistors T1 to T8. The first node setting unit 401_1 may include at least one N-type transistor T3, T4, T7, and T8.

The first transistor T1 may include a first electrode receiving the voltage VGH having the logic high level, a second electrode, and a gate electrode receiving the scan start signal STP. The first transistor T1 may be a P-type transistor.

The second transistor T2 may include a first electrode connected to the second electrode of the first transistor T1, a second electrode connected to the first node QB, and a gate electrode receiving the first clock signal CK1. The second transistor T2 may be a P-type transistor.

The third transistor T3 may include a first electrode connected to the first node QB, a second electrode, and a gate electrode receiving the second clock signal CK2. The third transistor T3 may be an N-type transistor.

The fourth transistor T4 may include a first electrode connected to the second electrode of the third transistor T3, a second electrode receiving the voltage VGL having the logic low level, and a gate electrode receiving the scan start signal STP. The fourth transistor T4 may be an N-type transistor.

The fifth transistor T5 may include a first electrode receiving the voltage VGH having the logic high level, a second electrode, and a gate electrode connected to a second node Q. The fifth transistor T5 may be a P-type transistor.

The sixth transistor T6 may include a first electrode connected to the second electrode of the fifth transistor T5, a second electrode connected to the first node QB, and a gate electrode receiving the second clock signal CK2. The sixth transistor T6 may be a P-type transistor.

The seventh transistor T7 may include a first electrode connected to the first node QB, a second electrode, and a gate electrode receiving the first clock signal CK1. The seventh transistor T7 may be an N-type transistor.

The eighth transistor T8 may include a first electrode connected to the second electrode of the seventh transistor T7, a second electrode receiving the voltage VGL having the low level, and a gate electrode connected to the second node Q. The eighth transistor T8 may be an N-type transistor.

The initialization unit 402_1 may initialize one of the first node QB, the second node Q, and a third node QB_F according to a logic level of the initialization signal SESR. The initialization unit 402_1 may initialize the third node QB_F, when the initialization signal SESR has the logic low level. The initialized third node QB_F may be in a state in which the third node QB_F is charged at the logic high level.

The initialization unit 402_1 may include a ninth transistor T9. The ninth transistor T9 may include a first electrode receiving the voltage VGH having the logic high level, a second electrode connected to the third node QB_F, and a gate electrode receiving the initialization signal SESR. The ninth transistor T9 may be a P-type transistor.

The second node setting unit 403_1 may charge a voltage of the second node Q at the logic high level when a voltage of the first node QB has the logic low level, and may discharge the voltage of the second node Q at the logic low level when the voltage of the first node QB has the logic high level. The second node setting unit 403_1 may include tenth and eleventh transistors T10 and T11. The second node setting unit 403_1 may include at least one N-type transistor T11.

The tenth transistor T10 may include a first electrode receiving the voltage VGH having the logic high level, a second electrode connected to the second node Q, and a gate electrode connected to the first node QB. The tenth transistor T10 may be a P-type transistor.

The eleventh transistor T11 may include a first electrode connected to the second node Q, a second electrode receiving the voltage VGL having the logic low level, and a gate electrode connected to the first node QB. The eleventh transistor T11 may be an N-type transistor.

The third node setting unit 404_1 may charge a voltage of the third node QB_F at the logic high level when the voltage of the second node Q has the logic low level, and may discharge the voltage of the third node QB_F at the logic low level when the voltage of the second node Q has the logic high level. The third node setting unit 404_1 may include twelfth and thirteenth transistors T12 and T13. The third node setting unit 404_1 may include at least one N-type transistor T13.

The twelfth transistor T12 may include a first electrode receiving the voltage VGH having the logic high level, a second electrode connected to the third node QB_F, and a gate electrode connected to the second node Q. The twelfth transistor T12 may be a P-type transistor.

The thirteenth transistor T13 may include a first electrode connected to the third node QB_F, a second electrode receiving the voltage VGL having the logic low level, and a gate electrode connected to the second node Q. The thirteenth transistor T13 may be an N-type transistor.

The output unit 405_1 may output a scan signal having the logic high level VGH to the output terminal 201 when the voltage of the third node QB_F has the logic low level, and may output a scan signal having the logic low level VGL to the output terminal 201 when the voltage of the third node QB_F has the logic high level. The output unit 405_1 may include fourteenth and fifteenth transistors T14 and T15. The output unit 405_1 may include at least one N-type transistor T15.

The fourteenth transistor T14 may include a first electrode receiving the voltage VGH having the logic high level, a second electrode connected to the output terminal 201, and a gate electrode connected to the third node QB_F. The fourteenth transistor T14 may be a P-type transistor.

The fifteenth transistor T15 may include a first electrode connected to the output terminal 201, a second electrode receiving the voltage VGL having the logic low level, and a gate electrode connected to the third node QB_F. The fifteenth transistor T15 may be an N-type transistor.

The first stage ST1_1 may include a first capacitor C1. The first capacitor C1 may include a first electrode receiving the voltage VGH having the logic high level and may include a second electrode connected to the second node Q. Since the first capacitor C1 is provided for the purpose of maintaining the voltage of the second node Q, the first capacitor C1 may be configured such that the first electrode receives the voltage VGL having the logic low level. When/if a parasitic capacitance of the second node Q is sufficient according to a layout, the first capacitor C1 may be optional.

The first charge pump CP1_1 may supply a first bias voltage Vbias1 to a back-gate electrode of at least one N-type transistor included in each of the first node setting unit 401_1 and the third node setting unit 404_1. The first charge pump CP1_1 may supply the first bias voltage Vbias1 to a back-gate electrode of at least one N-type transistor included in each of the second node setting unit 403_1 and the output unit 405_1. The first charge pump CP1_1 may supply the first bias voltage Vbias1 to back-gate electrodes of the third transistor T3, the fourth transistor T4, the seventh transistor T7, the eighth transistor T8, the eleventh transistor T11, the thirteenth transistor T13, and the fifteenth transistor T15.

Channels of the transistors T3, T4, T7, T8, T11, T13, and T15 may each include an oxide semiconductor. The oxide semiconductor may have a negative threshold voltage. The first bias voltage Vbias1 lower than the low voltage VGL is applied to the back-gate electrodes of the transistors T3, T4, T7, T8, T11, T13, and T15, so that the transistors T3, T4, T7, T8, T11, T13, and T15 can have a positive threshold voltage.

The first charge pump CP1_1 may include sixteenth to eighteenth transistors T16, T17, and T18, a second capacitor C2, and a third capacitor C3. The sixteenth to eighteenth transistors T16, T17, and T18 may be P-type transistors.

The sixteenth transistor T16 may include a gate electrode and a first electrode both receiving the first reference voltage VREF1, and may include a second electrode connected to a fourth node PPN1.

The second capacitor C2 may include a first electrode connected to the fourth node PPN1 and may include a second electrode.

The seventeenth transistor T17 may include a first electrode connected to the second electrode of the second capacitor C2, a second electrode receiving the first clock signal CK, and a gate electrode connected to the fourth node PPN1. The second electrode of the seventeenth transistor T17 may receive the second clock signal CK2.

The eighteenth transistor T18 may include a first electrode and a gate electrode both connected to the fourth node PPN1, and may include a second electrode supplying the first bias voltage Vbias1.

The third capacitor C3 may include a first electrode receiving the first reference voltage VREF1 and may include a second electrode connected to the second electrode of the eighteenth transistor T18. Since the third capacitor C3 is provided for the purpose of maintaining the first bias voltage Vbias1, the third capacitor C3 may be configured such that the first electrode receives the voltage VGL having the low logic level. When/if a parasitic capacitance with respect to the first bias voltage Vbias1 is sufficient according to a layout, the third capacitor C3 may be optional.

Figure 9:
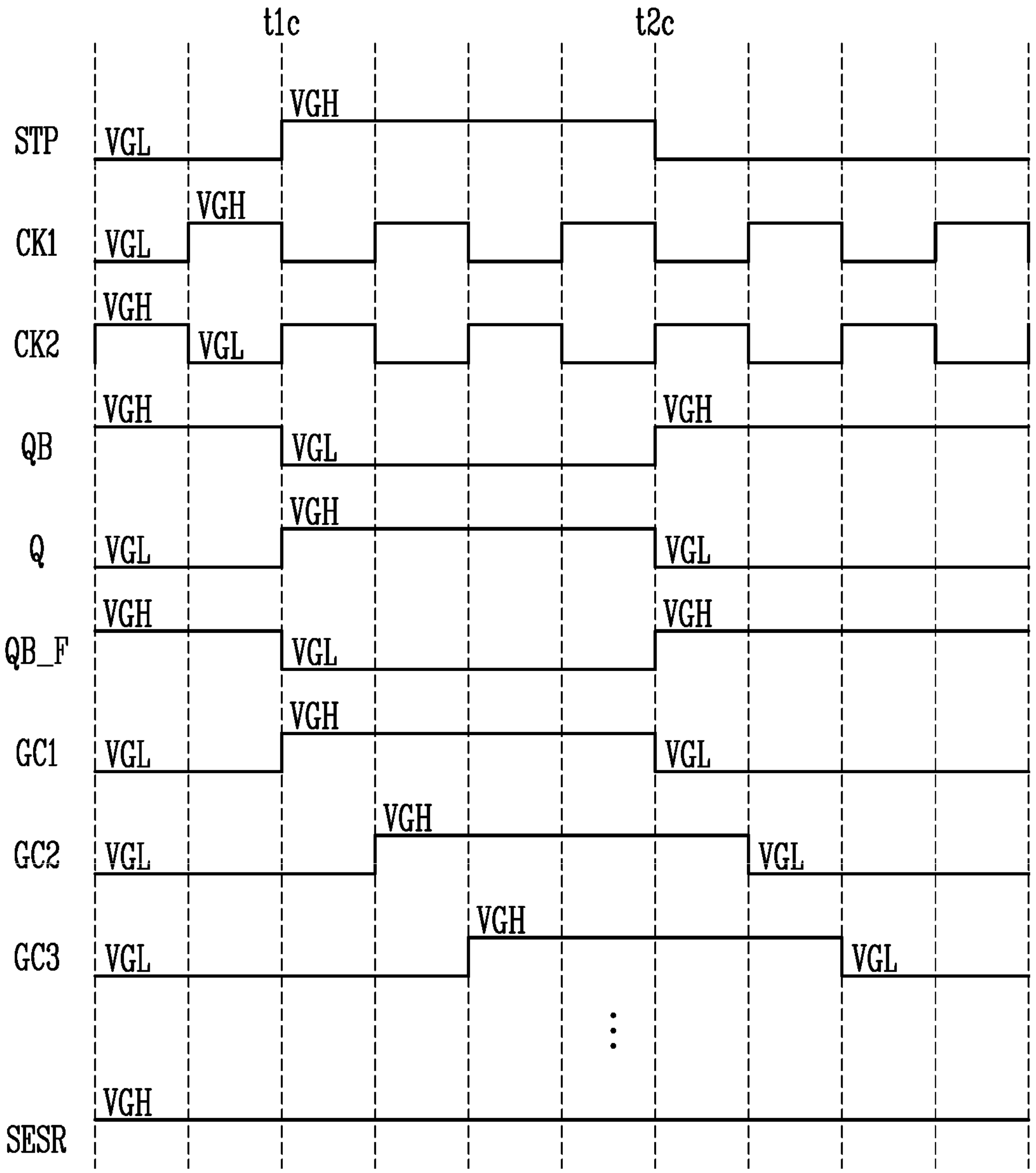
FIG. 9 illustrates an operation of the stage shown in FIG. 8 in accordance with an embodiment.

FIG. 9 illustrates an operation of the stage shown in FIG. 8.

First, although not shown in the drawing, the initialization signal SESR may be set to the logic low level VGL before a time t1*c*, so that third nodes QB_F of the stages ST1_1, ST2_1, ST3_1, ST4_1, . . . are initialized to the logic high level. Subsequently, before the time t1*c*, the initialization signal SESR may be set to the logic high level VGH shown in FIG. 9.

The phrase difference between the first clock signal CK1 and the second clock signal CK2 may be 180 degrees. For example, when the first clock signal CK1 has the logic high level VGH, the second clock signal CK2 may have the logic low level VGL. When the first clock signal CK1 has the logic low level VGL, the second clock signal CK2 may have the logic high level VGH.

At the time t1*c*, the scan start signal STP having the logic high level VGH may be supplied. The second clock signal CK2 may have the logic high level VGH. Accordingly, the third transistor T3 and the fourth transistor T4 may be turned on, and the voltage of the first node QB may be discharged at the logic low level VGL.

Since the voltage of the first node QB has the logic low level VGL, the tenth transistor T10 may be turned on. Accordingly, the voltage of the second node Q may be charged at the logic high level VGH. Accordingly, the thirteenth transistor T13 may be turned on, and the voltage of the third node QB_F may be discharged at the logic low level VGL. Therefore, the fourteenth transistor T14 may be turned on, and the voltage VGH having the logic high level may be applied to the output terminal 201. Accordingly, a second scan signal having the logic high level VGH may be output to a second scan line GC1.

At a time t2*c*, since the scan start signal STP having the logic low level VGH is supplied, the voltages of the first node QB and the third node QB_F may be charged at the logic high level VGH, and the voltage of the second node Q may be discharged at the logic low level VGL. Accordingly, the second scan signal having the logic low level VGL may be output to the second scan line GC1.

A second stage ST2_1 may output a second scan signal having the logic high level VGH to a second scan line GC2, when the second scan signal of the second scan line GC1 and the first clock signal CK1 have the logic high level. A third stage ST3_1 may output a second scan signal having the logic high level VGH to a second scan line GC3, when the second scan signal of the second scan line GC2 and the second clock signal CK2 have the logic high level. Therefore, the scan driver 31_1 may sequentially output second scan signals.

Figure 10:
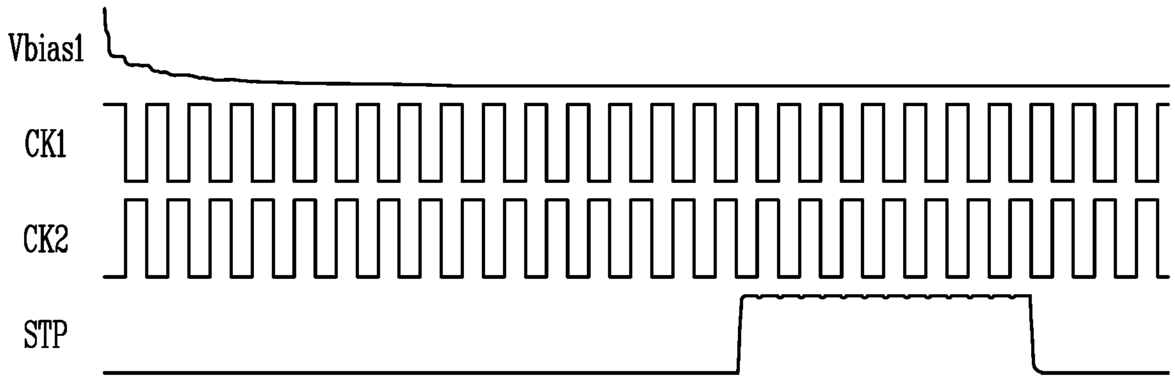
FIG. 10 illustrates a first bias voltage in accordance with an embodiment.

FIG. 10 illustrates the first bias voltage.

Referring to FIG. 10, the first bias voltage Vbias1 may be settled before the scan start signal STP having the logic high level is generated. An initial voltage of the fourth node PPN1 may correspond to a value obtained by subtracting a threshold voltage of the sixteenth transistor T16 from the first reference voltage VREF1. The first reference voltage VREF1 may be set higher than the low voltage VGL and lower than the high voltage VGH. When the first clock signal CK1 is changed from the logic high level VGH to the logic low level VGL, a voltage of the fourth node PPN1 becomes lower by a voltage difference VGH-VGL. Charges existing in the back-gate electrodes of the transistors T3, T4, T7, T8, T11, T13, and T15 come out through the turned-on eighteenth transistor T18. While repeating such a process (i.e., charge pumping), the settled first bias voltage Vbias becomes lower than the voltage VGL having the logic low level. Thus, no additional low voltage source for providing a voltage lower than the low voltage VGL is necessary, so that power consumption can be minimized.

Figure 11:
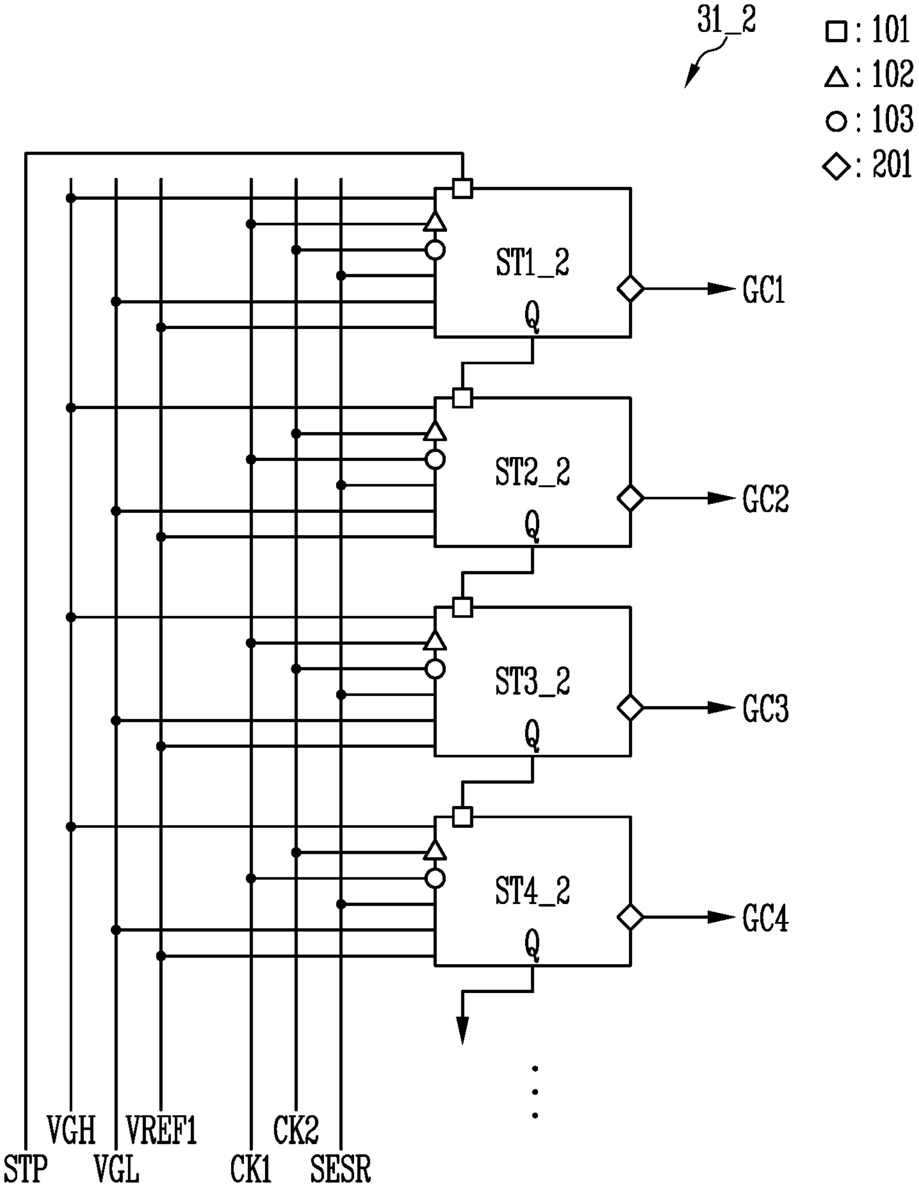
FIG. 11 illustrates a scan driver in accordance with an embodiment.

FIG. 11 illustrates a scan driver 31_2 in accordance with an embodiment.

Unlike the scan driver 31_1 shown in FIG. 7, in the scan driver 31_2 shown in FIG. 11, a first input terminal 101 of each of the other stages ST2_1, ST3_2, ST4_2, . . . except a first stage ST1_2 may be connected to a second node Q of a previous stage.

Referring to FIG. 9, a voltage level of the second node Q and a voltage level of the second scan signal are synchronized with each other, and hence the scan driver 31_2 shown in FIG. 11 may operate identically to the scan driver 31_1 shown in FIG. 7. A circuit structure of each of the stages ST1_2 to ST4_2 may be identical to the circuit structure shown in FIG. 8. Stages ST1_3 to ST1_8 shown in FIGS. 12 to 17 may be connected with the structure of the scan driver 31_1 shown in FIG. 7, and be connected with the structure of the scan driver 31_2 shown in FIG. 11.

Each of FIGS. 12 to 17 illustrates a stage in accordance with other embodiments.

Figure 12:
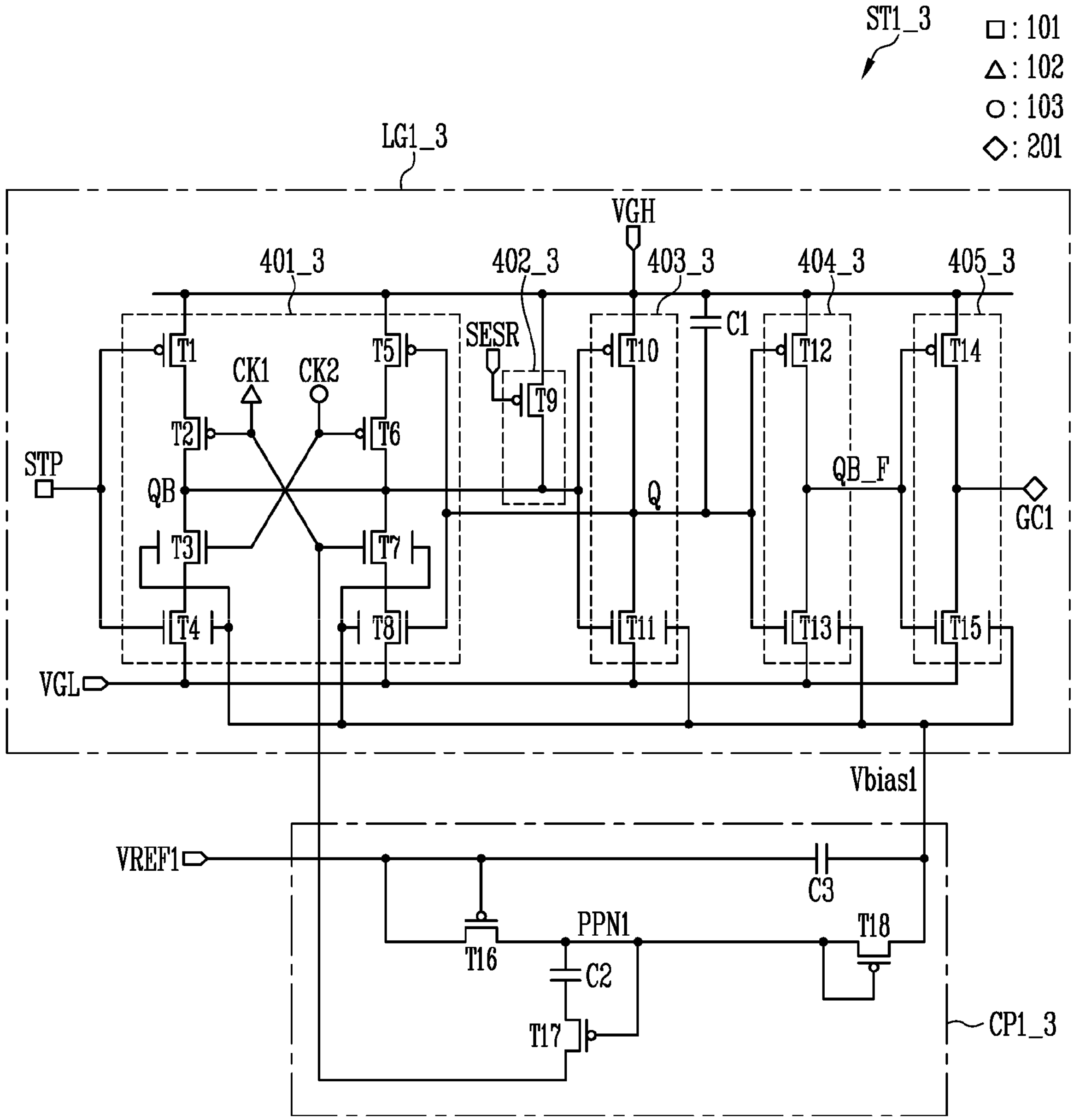

Referring to FIG. 12, a first stage ST1_3 may include a first node setting unit 401_3, an initialization unit 402_3, a second node setting unit 403_3, a third node setting unit

404_3, an output unit 405_3, and a first charge pump CP1_3. Some features of the first stage ST1_3 may be analogous to or identical to some features of the first stage ST1_1 shown in FIG. 8.

The initialization unit 402_3 may initialize one of a first node QB, a second node Q, and a third node QB_F according to a logic level of the initialization signal SESR. The initialization unit 402_3 may initialize the first node QB, when the initialization signal SESR has the logic low level. The initialized first node QB may be charged at the logic high level.

The initialization unit 402_3 may include a ninth transistor T9. The ninth transistor T9 may include a first electrode receiving the voltage VGH having the logic high level, a second electrode connected to the first node QB, and a gate electrode receiving the initialization signal SESR. The ninth transistor T9 may be a P-type transistor.

According to an operation of the initialization unit 402_3, when the first node QB is charged at the logic high level, the second node Q is discharged at the logic low level, and the third node QB_F is charged at the logic high level. Therefore, the first stage ST1_3 may operate substantially identically to the first stage ST1_1 shown in FIG. 8.

Figure 13:
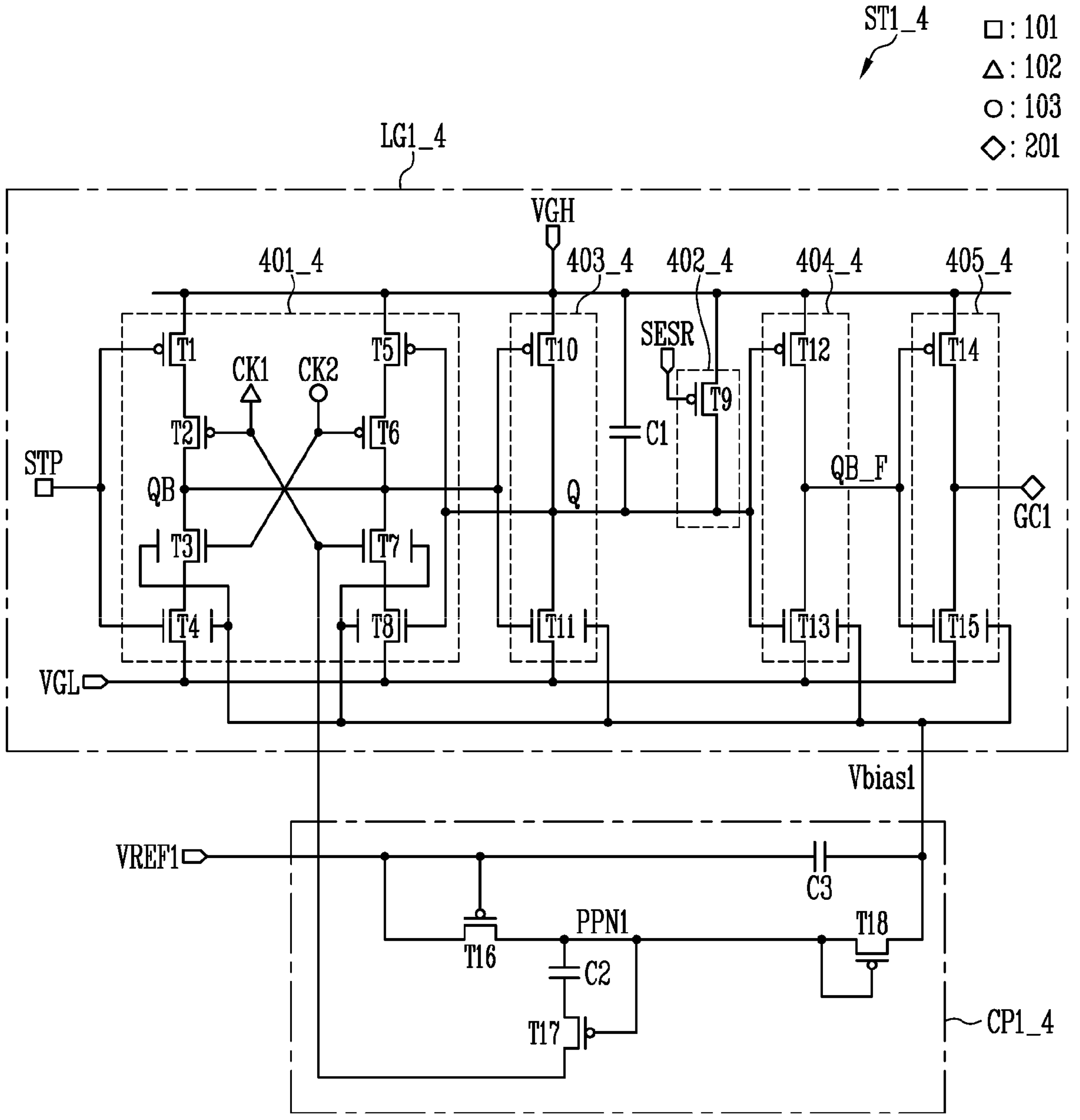

Referring to FIG. 13, a first stage ST1_4 may include a first node setting unit 401_4, an initialization unit 402_4, a second node setting unit 403_4, a third node setting unit 404_4, an output unit 405_4, and a first charge pump CP1_4. Some features of the first stage ST1_4 may be analogous to or identical to some features of the first stage ST1_1 shown in FIG. 8.

The initialization unit 402_4 may initialize one of a first node QB, a second node Q, and a third node QB_F according to a logic level of the initialization signal SESR. In the embodiment shown in FIG. 13, the initialization unit 402_4 may initialize the second node Q, when the initialization signal SESR has the logic low level. The initialized second node Q may be in a state in which the second node Q is charged at the logic high level.

The initialization unit 402_4 may include a ninth transistor T9. The ninth transistor T9 may include a first electrode receiving the voltage VGH having the logic high level, a second electrode connected to the second node Q, and a gate electrode receiving the initialization signal SESR. The ninth transistor T9 may be a P-type transistor.

Unlike FIG. 9, according to the structure shown in FIG. 13, the scan start signal STP is to have a pulse of the logic low level VGL during a period t1$c$ to $t$2$c$. A scan signal output from the first stage ST1_4 may be used to control the transistors M2 and M7 as P-type transistors (see FIG. 2). The scan signal output from the first stage ST1_4 may be used to control the transistors M5 and M6 by adjusting a turn-on level period and a turn-off level period.

Figure 14:
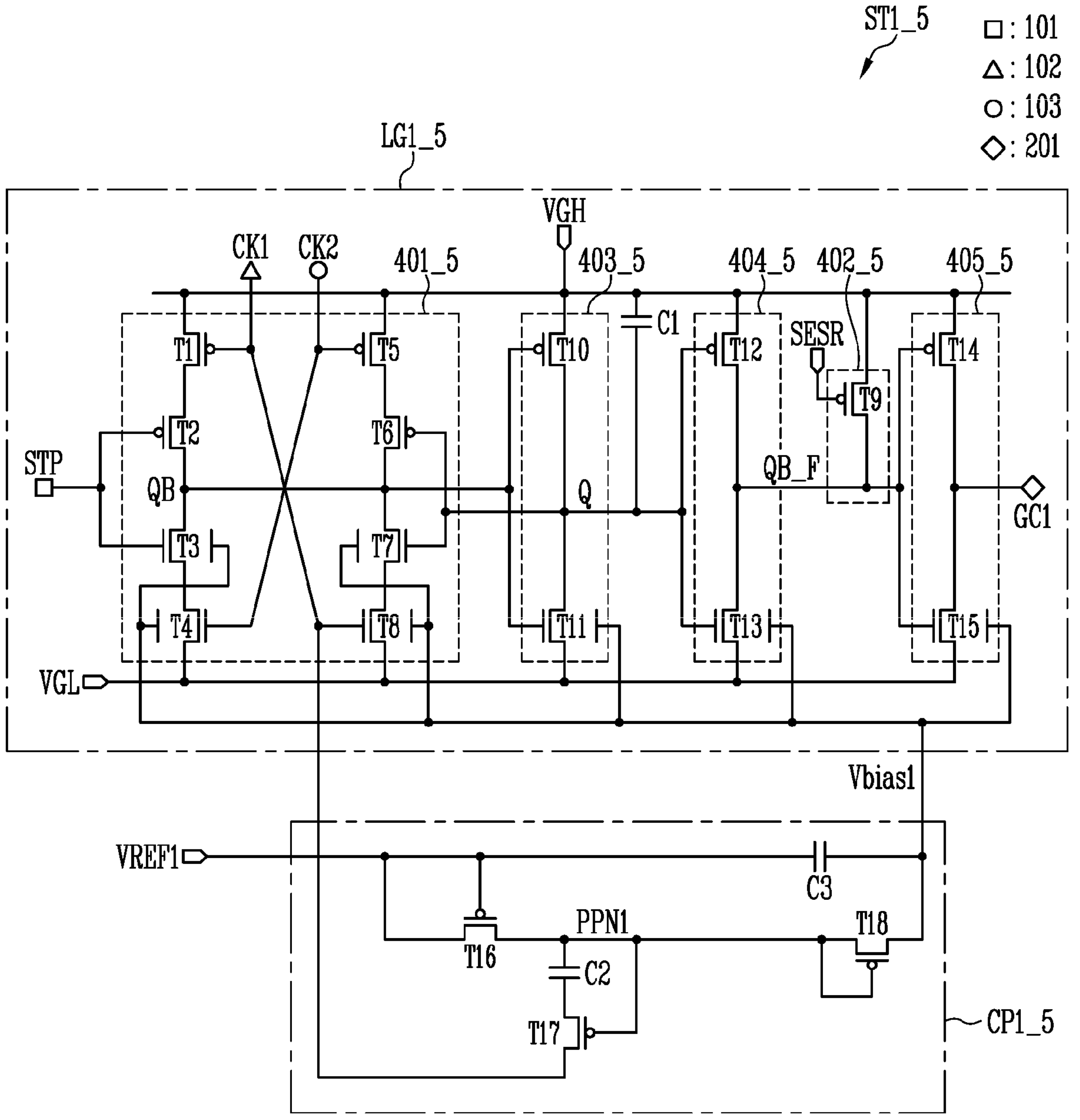

Referring to FIG. 14, a first stage ST1_5 may include a first node setting unit 401_5, an initialization unit 402_5, a second node setting unit 403_5, a third node setting unit 404_5, an output unit 405_5, and a first charge pump CP1_5. Some features of the first stage ST1_5 may be analogous to or identical to some features of the first stage ST1_1 shown in FIG. 8.

The first node setting unit 401_5 may include first to eighth transistors T8. The first transistor T1 may include a first electrode receiving the voltage VGH having the logic high level, a second electrode, and a gate electrode receiving the first clock signal CK1. The first transistor T1 may be a P-type transistor.

The second transistor T2 may include a first electrode connected to the second electrode of the first transistor T1, a second electrode connected to a first node QB, and a gate electrode receiving the scan start signal STP. The second transistor T2 may be a P-type transistor.

The third transistor T3 may include a first electrode connected to the first node QB, a second electrode, and a gate electrode receiving the scan start signal STP. The third transistor T3 may be an N-type transistor.

The fourth transistor T4 may include a first electrode connected to the second electrode of the third transistor T3, a second electrode receiving the voltage VGL having the logic low level, and a gate electrode receiving the second clock signal CK2. The fourth transistor T4 may be an N-type transistor.

The fifth transistor T5 may include a first electrode receiving the voltage VGH having the logic high level, a second electrode, and a gate electrode receiving the second clock signal CK2. The fifth transistor T5 may be a P-type transistor.

The sixth transistor T6 may include a first electrode connected to the second electrode of the fifth transistor T5, a second electrode connected to the first node QB, and a gate electrode connected to a second node Q. The sixth transistor T6 may be a P-type transistor.

The seventh transistor T7 may include a first electrode connected to the first node QB, a second electrode, and a gate electrode connected to the second node Q. The seventh transistor T7 may be an N-type transistor.

The eighth transistor T8 may include a first electrode connected to the second electrode of the seventh transistor T7, a second electrode receiving the voltage VGL having the logic low level, and a gate electrode receiving the first clock signal CK1. The eighth transistor T8 may be an N-type transistor.

An operation of the first node setting unit 401_5 is identical to the operation of the first node setting unit 401_1 shown in FIG. 8.

Figure 15:
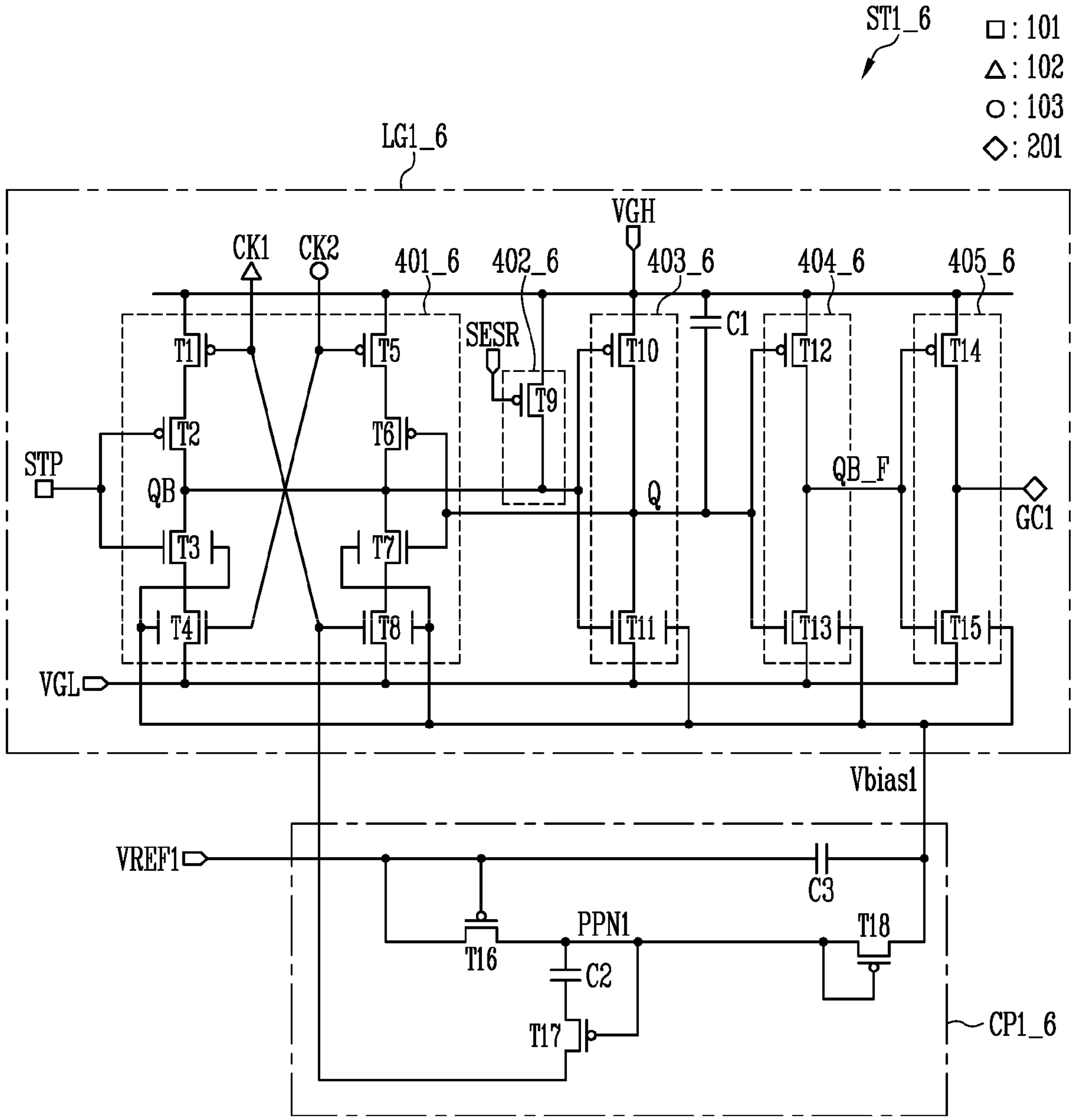

Referring to FIG. 15, a first stage ST1_6 may include a first node setting unit 401_6, an initialization unit 402_6, a second node setting unit 403_6, a third node setting unit 404_6, an output unit 405_6, and a first charge pump CP1_6. Some features of the first stage ST1_6 may be analogous to or identical to some features of the first stage ST1_5 shown in FIG. 14.

In the first stage ST1_6, a configuration of the initialization unit 402_6 is different from the configuration of the initialization unit 402_5 of the first stage ST1_5. A configuration and an operation of the initialization unit 402_6 are identical to the configuration and the operation of the initialization unit 402_3 shown in FIG. 12.

Figure 16:
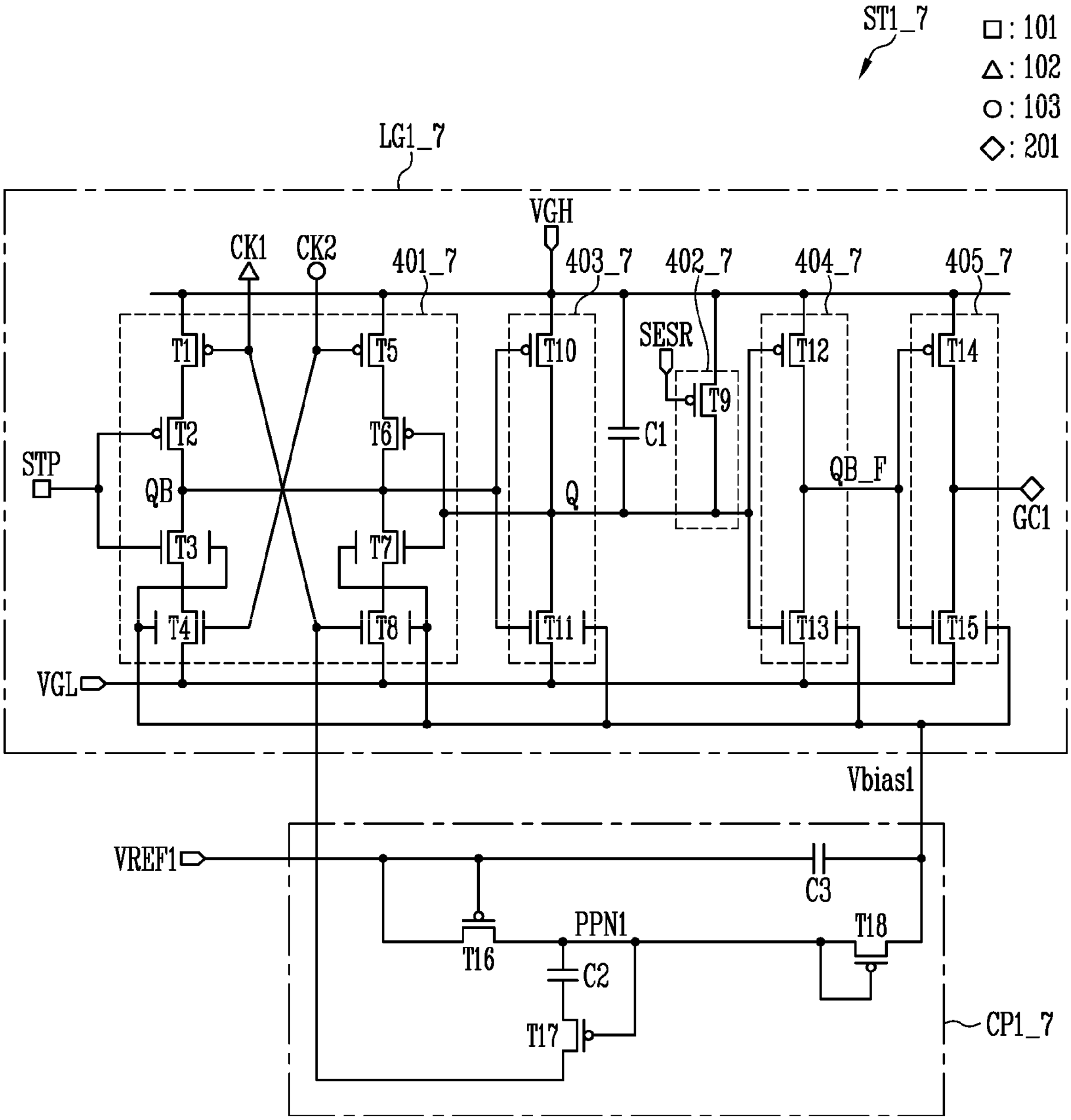

Referring to FIG. 16, a first stage ST1_7 may include a first node setting unit 401_7, an initialization unit 402_7, a second node setting unit 403_7, a third node setting unit 404_7, an output unit 405_7, and a first charge pump CP1_7. Some features of the first stage ST1_7 may be analogous to or identical to those of the first stage ST1_5 shown in FIG. 14.

In the first stage ST1_7, a configuration of the initialization unit 402_7 is different from the configuration of the initialization unit 402_5 of the first stage ST1_5. A configuration and an operation of the initialization unit 402_7 are identical to the configuration and the operation of the initialization unit 402_4 shown in FIG. 13.

Figure 17:
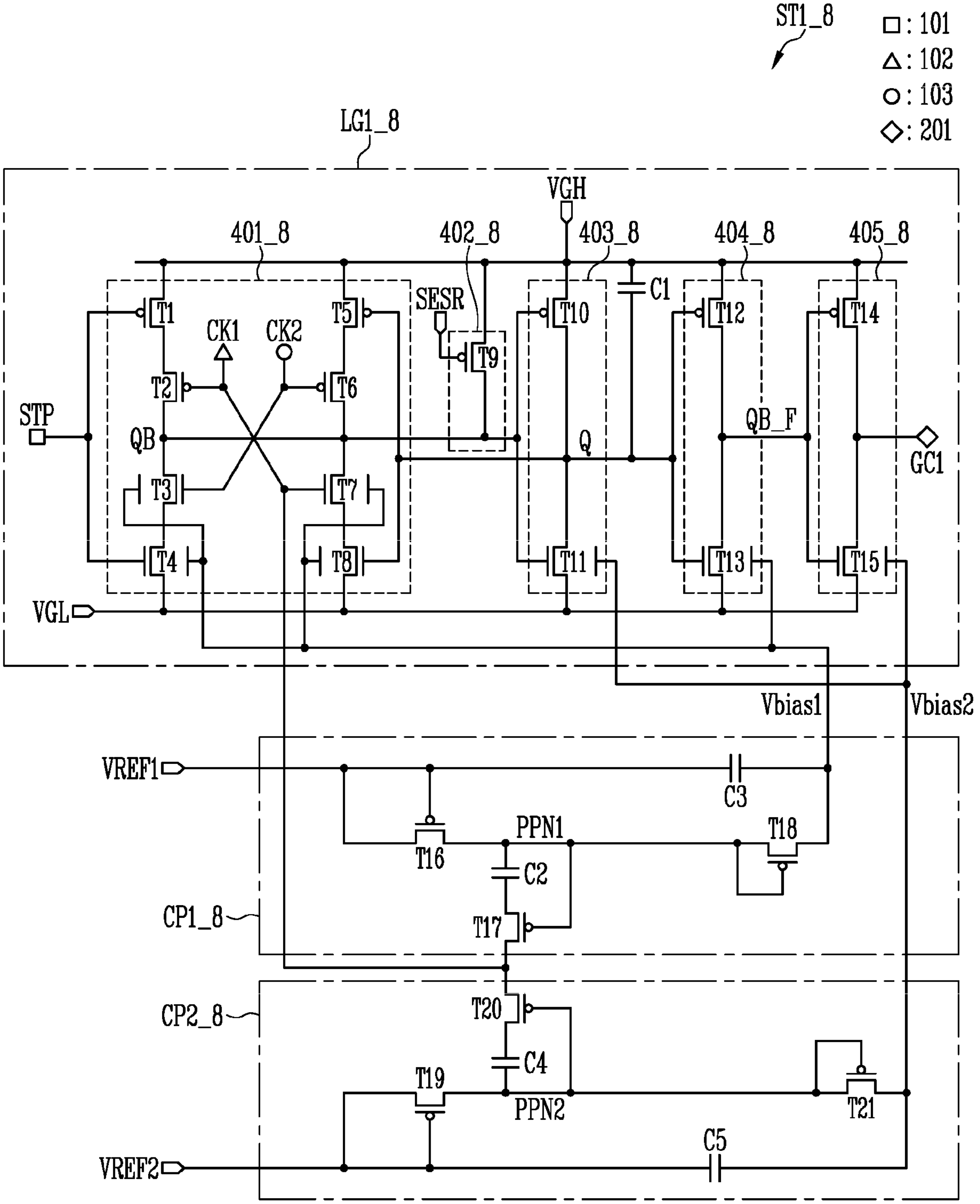
FIG. 17 illustrates a stage in accordance with an embodiment.

Referring to FIG. 17, a first stage ST1_8 may include a first node setting unit 401_8, an initialization unit 402_8, a second node setting unit 403_8, a third node setting unit 404_8, an output unit 405_8, a first charge pump CP1_8, and a second charge pump CP2_8. Some features of the first stage ST1_8 may be analogous to or identical to some features of the first stage ST1_3 shown in FIG. 12.

The first stage ST1_8 is different from the first stage ST1_3 shown in FIG. 12 in that the first stage ST1_8 further includes the second charge pump CP2_8.

The second charge pump CP2_8 may supply a second bias voltage Vbias2 to a back-gate electrode of at least one N-type transistor T11 and T15 included in each of the second node setting unit 403_8 and the output unit 405_8. The first charge pump CP1_8 may supply a first bias voltage Vbias1 to a back-gate electrode of at least one N-type transistor T3, T4, T7, T8, and T13 included in each of the first node setting unit 401_8 and the third node setting unit 404_8.

The second charge pump CP2_8 may include nineteenth to twenty-first transistors T19, T20, and T21, a fourth capacitor C4, and a fifth capacitor C5.

The nineteenth transistor T19 may include a gate electrode and a first electrode both receiving a second reference voltage VREF2, and may include a second electrode connected to a fifth node PPN2.

The fourth capacitor C4 may include a first electrode and a second electrode connected to the fifth node PPN2.

The twentieth transistor T20 may include a first electrode receiving the first clock signal CK1, a second electrode connected to the first electrode of the fourth capacitor C4, and a gate electrode connected to the fifth node PPN2.

The twenty-first transistor T21 may include a first electrode and a gate electrode both connected to the fifth node PPN2, and may include a second electrode supplying the second bias voltage Vbias2.

The fifth capacitor C5 may include a first electrode receiving the second reference voltage VREF2 and a second electrode connected to the second electrode of the twenty-first transistor T21. Since the fifth capacitor C5 is provided for the purpose of maintaining the second bias voltage Vbias2, the fifth capacitor C5 may be configured such that the first electrode receives the voltage VGL having the logic low level. When/if a parasitic capacitance with respect to the second bias voltage Vbias2 is sufficient according to a layout, the fifth capacitor C5 may be optional.

An operation of the second charge pump CP2_8 is identical to the operation of the first charge pump CP1_1 described with reference to FIG. 10.

As time elapses, threshold voltages of the transistors T3, T4, T7, T8, and T13 having a relatively long turn-off period are negative-shifted. Meanwhile, threshold voltages of the transistors T11 and T15 having a relatively long turn-on period are positive-shifted.

Therefore, although the first reference voltage VREF1 and the second reference voltage VREF2 are set to have the same initial value, it is necessary to set the second reference voltage VREF2 to be higher than the first reference voltage VREF1 as time elapses. Since the second reference voltage VREF2 is set higher than the first reference voltage VREF1, the settled second bias voltage Vbias2 becomes higher than the settled first bias voltage Vbias1, and threshold voltages of the N-type transistors T3, T4, T7, T8, T11, T13, and T15 are set similar to one another.

An initial value of the second reference voltage VREF2 may be set higher than the low voltage VGL and lower than the high voltage VGH. The second reference voltage VREF2 set to increase as time elapses may also be set higher than the low voltage VGL and lower than the high voltage VGH.

The same effect may occur even when the second charge pump CP2_8 is added to not only the first stage ST1_3 but also at least one of the first stages ST1_1 to ST1_7 shown in FIGS. 8 to 16. At least one of the first charge pumps CP1_1 to CP1_7 of the first stages ST1_1 to ST1_7 shown in FIGS. 8 to 16 may be replaced with the first charge pump CP1_8 and the second charge pump CP2_8 shown in FIG. 17.

Figure 18:
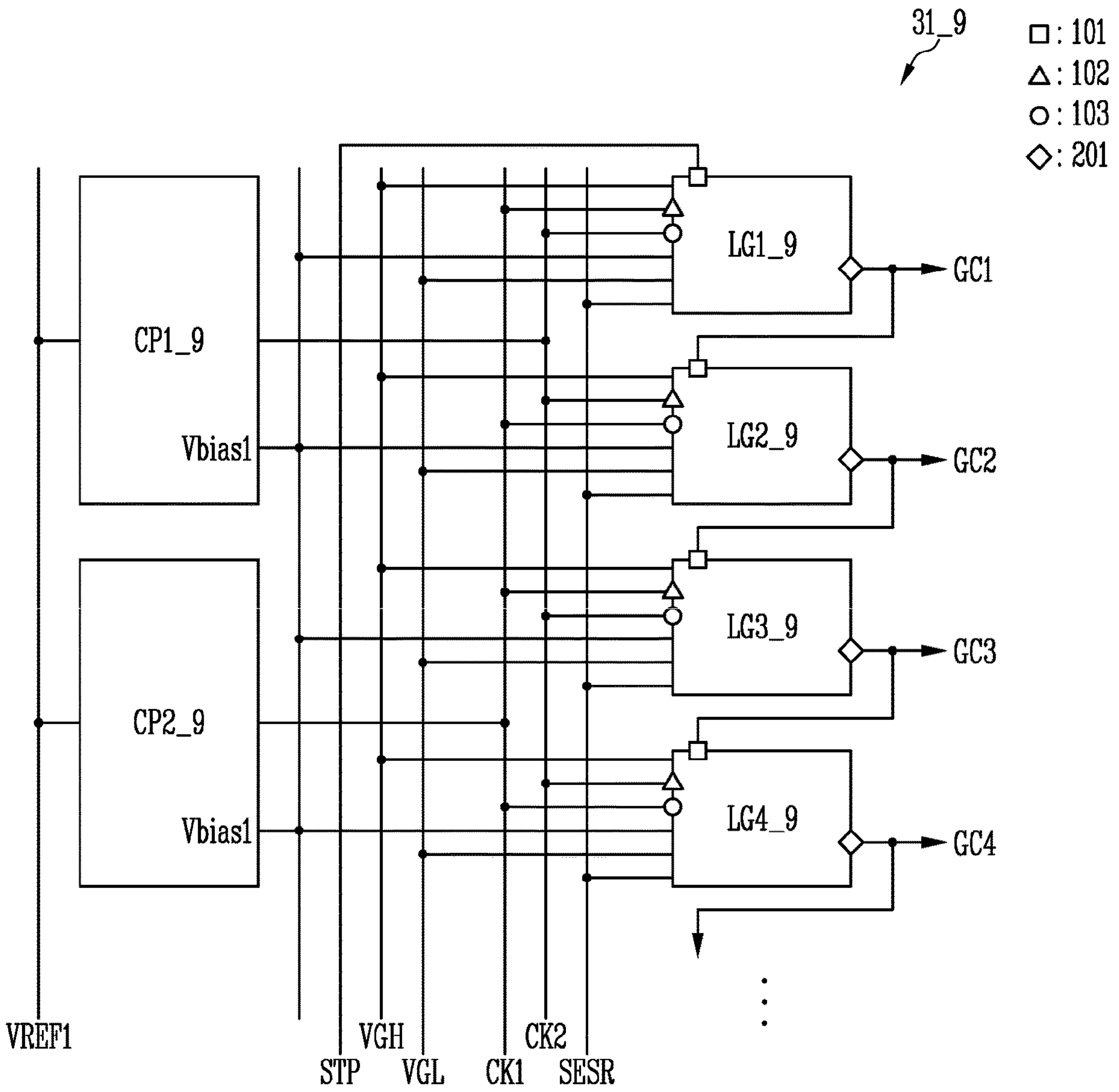
Figure 19:
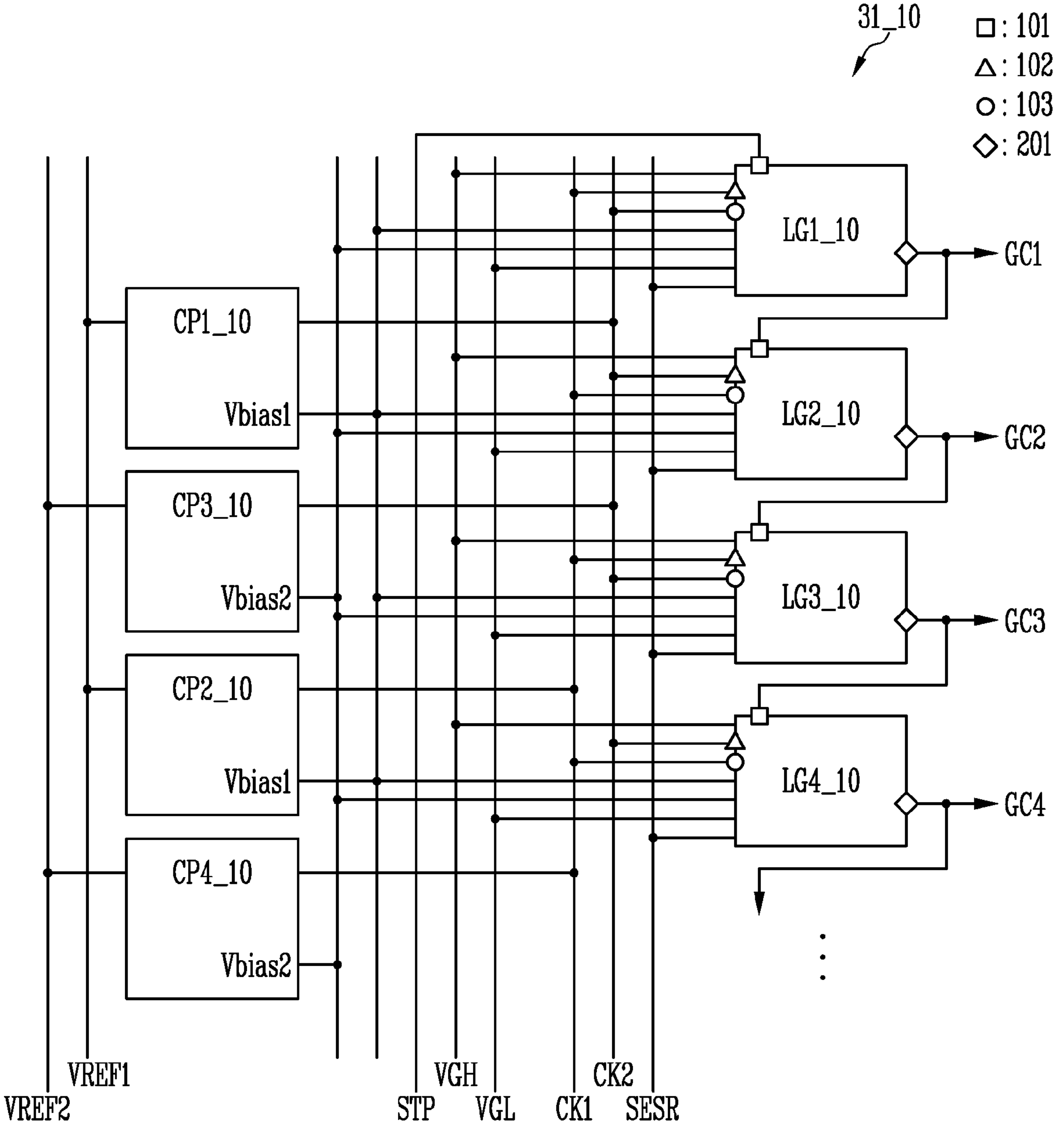
FIG. 19 illustrates a scan driver in accordance with an embodiment.

Each of FIGS. 18 and 19 illustrates a scan driver in accordance with an embodiment.

Referring to FIG. 18, stages LG1_9, LG2_9, LG3_9, LG4_9, . . . of a scan driver 31_9 may share a first charge pump CP1_9. Unlike FIG. 8, the stages LG1_9, LG2_9, LG3_9, LG4_9, . . . may not include the dedicated first charge pump CP1_1.

The scan driver 31_9 may further include a second charge pump CP2_9 supplying the first bias voltage Vbias1. The first charge pump CP1_9 may operate based on the second clock signal CK2, and the second charge pump CP2_9 may operate based on the first clock signal CK1. The first charge pump CP1_9 may operate based on the first clock signal CK1, and the second charge pump CP2_9 may operate based on the second clock signal CK2.

In accordance with the embodiment shown in FIG. 18, there is no floating period of the first bias voltage Vbias1, such that the settled first bias voltage Vbias1 can be provided. The scan driver 31_9 may include a plurality of first charge pumps CP1_9 and a plurality of second charge pumps CP2_9.

Referring to FIG. 19, stages LG1_10, LG2_10, LG3_10, LG4_10, . . . of a scan driver 31_10 may share a first charge pump CP1_10, a second charge pump CP2_10, a third charge pump CP3_10, and a fourth charge pump CP4_10. The term "sharing" may mean "all be connected to."

The first charge pump CP1_10 and the second charge pump CP2_10 may stably generate the first bias voltage Vbias1 having no floating period, based on the first reference voltage VREF1, the first clock signal CK1, and the second clock signal CK2.

The third charge pump CP3_10 and the fourth charge pump CP4_10 may stably generate the second bias voltage Vbias2 having no floating period, based on the second reference voltage VREF2, the first clock signal CK1, and the second clock signal CK2.

Transistors T3, T4, T7, T8, and T13 of a stage (to which the first bias voltage Vbias1 is provided) and transistors T11 and T15 of a stage (to which the second bias voltage Vbias2 is provided) are the same as those described with reference to FIG. 17.

In accordance with embodiments, since a pulse of a scan signal or an emission signal has no middle step shape, a display device may display images with minimum horizontal defects, and the power consumption of the display device can be minimized.

Example embodiments have been disclosed. Although specific terms are employed, they are used and are to be interpreted in a generic and descriptive sense and not for purpose of limitation. Features described in connection with a particular embodiment may be used singly or in combination with features described in connection with other embodiments unless otherwise specifically indicated. Various changes in form and details may be made in the described embodiments without departing from the scope set forth in the following claims.

What is claimed is:

1. A display device comprising:

scan lines;

pixels electrically connected to the scan lines; and a scan driver including stages for supplying scan signals through the scan lines to the pixels, wherein the stages include a stage that includes:

a first node setting unit configured to discharge a voltage of a first node at a logic low level when a scan start signal or a carry signal has a logic high level and a first clock signal or a second clock signal has the logic high level;

a second node setting unit configured to charge a voltage of a second node at the logic high level when the voltage of the first node has the logic low level, and configured to discharge the voltage of the second node at the logic low level when the voltage of the first node has the logic high level;

a third node setting unit configured to charge a voltage of a third node at the logic high level when the voltage of the second node has the logic low level, and configured to discharge the voltage of the third node at the logic low level when the voltage of the second node has the logic high level; and an output unit configured to output a scan signal having the logic high level when the voltage of the third node has the logic low level, and configured to output a scan signal having the logic low level when the voltage of the third node has the logic high level, wherein each of the first node setting unit and the third node setting unit includes at least one N-type transistor that comprises a back-gate electrode, and wherein the scan driver further includes a first charge pump for supplying a first bias voltage to the back-gate electrode of the at least one N-type transistor included in each of the first node setting unit and the third node setting unit.

2. The display device of claim 1, wherein the stage further includes an initialization unit configured to initialize one of the first node, the second node, and the third node according to a logic level of an initialization signal.

3. The display device of claim 2, wherein the first node setting unit includes:

a first transistor including a first electrode receiving a voltage having the logic high level, a second electrode, and a gate electrode receiving the scan start signal or the carry signal, the first transistor being a P-type transistor;

a second transistor including a first electrode electrically connected to the second electrode of the first transistor, a second electrode electrically connected to the first node, and a gate electrode receiving the first clock signal, the second transistor being a P-type transistor;

a third transistor including a first electrode electrically connected to the first node, a second electrode, and a gate electrode receiving the second clock signal, the third transistor being an N-type transistor; and a fourth transistor including a first electrode electrically connected to the second electrode of the third transistor, a second electrode receiving a voltage having the logic low level, and a gate electrode receiving the scan start signal or the carry signal, the fourth transistor being an N-type transistor.

4. The display device of claim 3, wherein the first node setting unit further includes:

a fifth transistor including a first electrode receiving the voltage of the logic high level, a second electrode, and a gate electrode electrically connected to the second node, the fifth transistor being a P-type transistor;

a sixth transistor including a first electrode electrically connected to the second electrode of the fifth transistor, a second electrode electrically connected to the first node, and a gate electrode receiving the second clock signal, the sixth transistor being a P-type transistor;

a seventh transistor including a first electrode electrically connected to the first node, a second electrode, and a gate electrode receiving the first clock signal, the seventh transistor being an N-type transistor; and an eighth transistor including a first electrode electrically connected to the second electrode of the seventh transistor, a second electrode receiving the voltage having the logic low level, and a gate electrode electrically connected to the second node, the eighth transistor being an N-type transistor.

5. The display device of claim 4, wherein the initialization unit includes a ninth transistor including a first electrode receiving the voltage having the logic high level, a second electrode electrically connected to the first node, and a gate electrode receiving the initialization signal, the ninth transistor being a P-type transistor.

6. The display device of claim 5, wherein the second node setting unit includes:

a tenth transistor including a first electrode receiving the voltage having the logic high level, a second electrode electrically connected to the second node, and a gate electrode electrically connected to the first node, the tenth transistor being a P-type transistor; and an eleventh transistor including a first electrode electrically connected to the second node, a second electrode receiving the voltage having the logic low level, and a gate electrode electrically connected to the first node, the eleventh transistor being an N-type transistor.

7. The display device of claim 6, wherein the third node setting unit includes:

a twelfth transistor including a first electrode receiving the voltage having the logic high level, a second electrode electrically connected to the third node, and a gate electrode electrically connected to the second node, the twelfth transistor being a P-type transistor; and a thirteenth transistor including a first electrode electrically connected to the third node, a second electrode receiving the voltage having the logic low level, and a gate electrode electrically connected to the second node, the thirteenth transistor being an N-type transistor.

8. The display device of claim 7, wherein the output unit includes:

a fourteenth transistor including a first electrode receiving the voltage having the logic high level, a second electrode electrically connected to an output terminal, and a gate electrode electrically connected to the third node, the fourteenth transistor being a P-type transistor; and a fifteenth transistor including a first electrode electrically connected to the output terminal, a second electrode receiving the voltage having the logic low level, and a gate electrode electrically connected to the third node, the fifteenth transistor being an N-type transistor.

9. The display device of claim 8, wherein the stage further includes a first capacitor including a first electrode receiving the voltage having the logic high level and a second electrode electrically connected to the second node.

10. The display device of claim 9, wherein the first charge pump includes:

a sixteenth transistor including a gate electrode receiving a first reference voltage, a first electrode receiving the first reference voltage, and a second electrode electrically connected to a fourth node;

a second capacitor including a first electrode electrically connected to the fourth node and including a second electrode;

a seventeenth transistor including a first electrode electrically connected to the second electrode of the second capacitor, a second electrode receiving the first clock signal or the second clock signal, and a gate electrode electrically connected to the fourth node; and an eighteenth transistor including a first electrode electrically connected to the fourth node, a gate electrode electrically connected to the fourth node, and a second electrode supplying the first bias voltage.

11. The display device of claim 10, wherein the first charge pump further includes a third capacitor including a first electrode receiving the first reference voltage and a second electrode electrically connected to the second electrode of the eighteenth transistor.

12. The display device of claim 11, wherein each of the second node setting unit and the output unit includes at least one N-type transistor that comprises a back-gate electrode, and wherein the first charge pump supplies the first bias voltage to the back-gate electrode of the at least one N-type transistor included in each of the second node setting unit and the output unit.

13. The display device of claim 12, wherein the first bias voltage is supplied to back-gate electrodes of the third transistor, the fourth transistor, the seventh transistor, the eighth transistor, the eleventh transistor, the thirteenth transistor, and the fifteenth transistor.

14. The display device of claim 11, wherein each of the second node setting unit and the output unit includes at least one N-type transistor that comprises a back-gate electrode, and wherein the stage further includes a second charge pump configured to supply a second bias voltage to the back-gate electrode of the at least one N-type transistor included in each of the second node setting unit and the output unit.

15. The display device of claim 14, wherein the first bias voltage is supplied to back-gate electrodes of the third transistor, the fourth transistor, the seventh transistor, the eighth transistor, and the thirteenth transistor, and the second bias voltage is supplied to back-gate electrodes of the eleventh transistor and the fifteenth transistor.

16. The display device of claim 14, wherein the second charge pump includes:

a nineteenth transistor including a gate electrode receiving a second reference voltage, a first electrode receiving the second reference voltage, and a second electrode electrically connected to a fifth node;

a fourth capacitor including a first electrode and including a second electrode electrically connected to the fifth node;

a twentieth transistor including a first electrode receiving the first clock signal or the second clock signal, a second electrode electrically connected to the first electrode of the fourth capacitor, and a gate electrode electrically connected to the fifth node; and a twenty-first transistor including a first electrode electrically connected to the fifth node, a gate electrode electrically connected to the fifth node, and a second electrode supplying the second bias voltage.

17. The display device of claim 16, wherein the first reference voltage and the second reference voltage are set to have the same initial value, and wherein the second reference voltage is set higher than the first reference voltage afterward.

18. The display device of claim 1, wherein the scan driver further includes a second charge pump configured to supply the first bias voltage, wherein the first charge pump operates based on the second clock signal, and wherein the second charge pump operates based on the first clock signal, and wherein a phrase difference between the first clock signal and the second clock signal is 180 degrees.

19. The display device of claim 1, wherein the first node setting unit includes:

a first transistor including a first electrode receiving a voltage having the logic high level, a second electrode, and a gate electrode receiving the first clock signal, the first transistor being a P-type transistor;

a second transistor including a first electrode electrically connected to the second electrode of the first transistor, a second electrode electrically connected to the first node, and a gate electrode receiving the scan start signal or the carry signal, the second transistor being a P-type transistor;

a third transistor including a first electrode electrically connected to the first node, a second electrode, and a gate electrode receiving the scan start signal or the carry signal, the third transistor being an N-type transistor; and a fourth transistor including a first electrode electrically connected to the second electrode of the third transistor, a second electrode receiving a voltage having the logic low level, and a gate electrode receiving the second clock signal, the fourth transistor being an N-type transistor.

20. The display device of claim 19, wherein the first node setting unit further includes:

a fifth transistor including a first electrode receiving the voltage having the logic high level, a second electrode, and a gate electrode receiving the second clock signal, the fifth transistor being a P-type transistor;

a sixth transistor including a first electrode electrically connected to the second electrode of the fifth transistor, a second electrode electrically connected to the first node, and a gate electrode electrically connected to the second node, the sixth transistor being a P-type transistor;

a seventh transistor including a first electrode electrically connected to the first node, a second electrode, and a gate electrode electrically connected to the second node, the seventh transistor being an N-type transistor; and an eighth transistor including a first electrode electrically connected to the second electrode of the seventh transistor, a second electrode receiving the voltage having the logic low level, and a gate electrode receiving the first clock signal, the eighth transistor being an N-type transistor.

* * * * *